United States Patent
Kubo et al.

(10) Patent No.: US 11,704,079 B2
(45) Date of Patent: Jul. 18, 2023

(54) OUTPUT SYSTEM, INFORMATION PROCESSING SYSTEM, INCLUDING CIRCUITRY TO GENERATE A CHARACTER STRING TO PERFORM AUTHENTICATION FOR A USER, AND AUTHENTICATION METHOD

(71) Applicants: Naohiko Kubo, Kanagawa (JP); Naritake Kondoh, Kanagawa (JP)

(72) Inventors: Naohiko Kubo, Kanagawa (JP); Naritake Kondoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 54 days.

(21) Appl. No.: 17/500,943

(22) Filed: Oct. 14, 2021

(65) Prior Publication Data
US 2022/0129215 A1 Apr. 28, 2022

(30) Foreign Application Priority Data
Oct. 26, 2020 (JP) .................................. 2020-178671

(51) Int. Cl.
  *G06F 3/12* (2006.01)
  *G06F 21/35* (2013.01)
  *H04B 5/00* (2006.01)
(52) U.S. Cl.
  CPC .......... *G06F 3/1222* (2013.01); *G06F 3/1238* (2013.01); *G06F 21/35* (2013.01);
  (Continued)
(58) Field of Classification Search
  None
  See application file for complete search history.

(56) References Cited

U.S. PATENT DOCUMENTS

| | | | |
|---|---|---|---|
| 2013/0003106 A1* | 1/2013 | Nishida | G06F 3/1222 358/1.14 |
| 2015/0029535 A1* | 1/2015 | Kondoh | G06F 3/1238 358/1.14 |

(Continued)

FOREIGN PATENT DOCUMENTS

JP 2017-111799 6/2017

OTHER PUBLICATIONS

Extended European Search Report dated Mar. 21, 2022 in European Patent Application No. 21200771.0, 9 pages.

*Primary Examiner* — Haris Sabah
(74) *Attorney, Agent, or Firm* — Xsensus LLP

(57) ABSTRACT

An output system includes circuitry to generate information on a character string in response to an authentication request including user identification information transmitted from an output apparatus. The circuitry further transmits the information on the character string to an information processing device. In response to receiving the information on the character string and the user identification information from the output apparatus that has received the information on the character string and the user identification information from the information processing device, the circuitry further performs authentication for a user identified by the user identification information, based on the information on the character string and the user identification information, and transmits an authentication result to the output apparatus.

10 Claims, 15 Drawing Sheets

(52) U.S. Cl.
CPC ......... *H04B 5/0056* (2013.01); *G06F 3/1231* (2013.01); *G06F 3/1287* (2013.01); *G06F 3/1292* (2013.01)

(56) References Cited

U.S. PATENT DOCUMENTS

| | | |
|---|---|---|
| 2015/0092233 A1 | 4/2015 | Park et al. |
| 2015/0154484 A1 | 6/2015 | Iwasaki et al. |
| 2015/0339561 A1* | 11/2015 | Takenaka ............... G06F 3/1222 358/1.14 |
| 2015/0381842 A1* | 12/2015 | Mori ..................... G06F 3/1288 358/1.14 |
| 2017/0171399 A1 | 6/2017 | Yamada et al. |
| 2019/0050170 A1* | 2/2019 | Ren ....................... G06F 3/1288 |
| 2020/0241807 A1 | 7/2020 | Kondoh |
| 2021/0112143 A1 | 4/2021 | Kondoh |

* cited by examiner

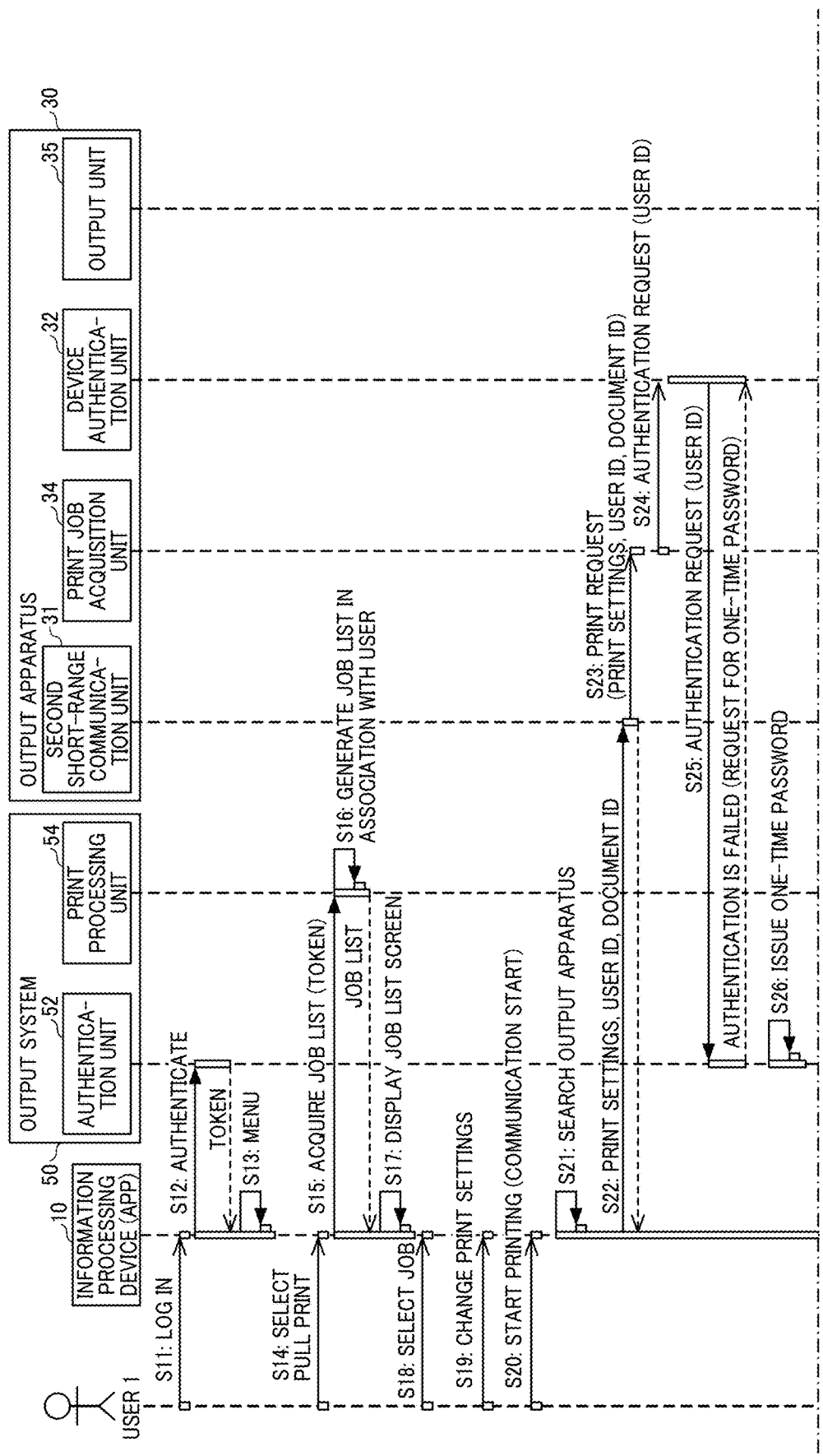

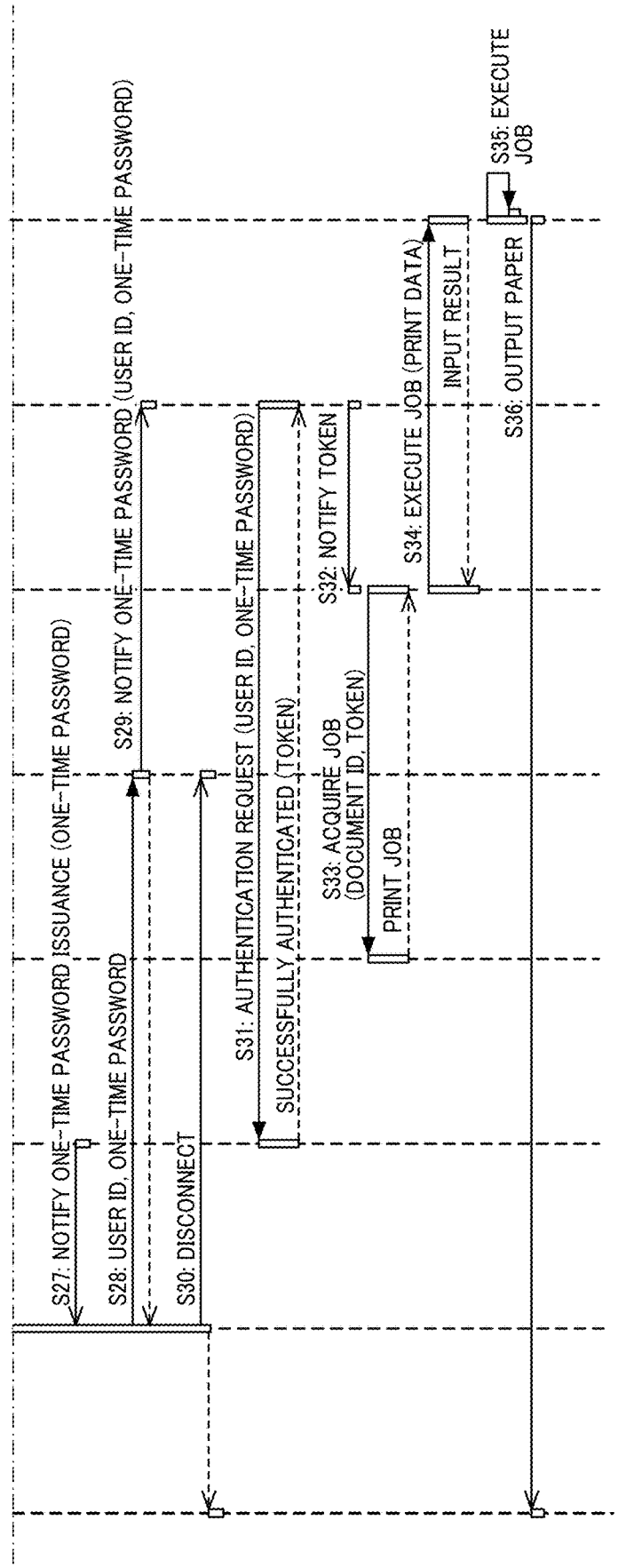

OUTPUT SYSTEM, INFORMATION PROCESSING SYSTEM, INCLUDING CIRCUITRY TO GENERATE A CHARACTER STRING TO PERFORM AUTHENTICATION FOR A USER, AND AUTHENTICATION METHOD

CROSS-REFERENCE TO RELATED APPLICATION

This patent application is based on and claims priority pursuant to 35 U.S.C. § 119(a) to Japanese Patent Application No. 2020-178671, filed on Oct. 26, 2020, in the Japan Patent Office, the entire disclosure of which is hereby incorporated by reference.

BACKGROUND

Technical Field

Embodiments of the present disclosure relate to an output system, an information processing system, and an authentication method.

Related Art

Pull print services in which an information processing device operated by a user transmits a print job to an output system on a network in advance, and the user downloads the print job from the output system to an arbitrary output apparatus to execute printing of the print job are known. Such a pull print service is also referred to as location-free printing or secure printing, for example.

A technique in which a user easily specifies a print job registered in a server on a network has been devised. There is a known system in which a server transmits a temporary code to an information processing device in response to acquiring a print job, and then a user who possesses the information processing device inputs the temporary code to an output apparatus that receives the print job from the server based on the temporary code and executes the received print job.

SUMMARY

An embodiment of the present disclosure includes an output system including circuitry to generate information on a character string in response to an authentication request including user identification information transmitted from an output apparatus. The circuitry further transmits the information on the character string to an information processing device. In response to receiving the information on the character string and the user identification information from the output apparatus that has received the information on the character string and the user identification information from the information processing device, the circuitry further performs authentication for a user identified by the user identification information, based on the information on the character string and the user identification information, and transmits an authentication result to the output apparatus.

An embodiment of the present disclosure includes an information processing system including an output apparatus and an output system. The output apparatus includes first circuitry to transmit, to the output system, an authentication request including user identification information transmitted from an information processing device. The output system includes second circuitry to generate information on a character string in response to the authentication request including the user identification information transmitted from the output apparatus. The second circuitry of the output system further transmits the information on the character string to the information processing device. The first circuitry of the output apparatus receives the information on the character string from the information processing device. In response to receiving the information on the character string and the user identification information from the output apparatus that has received the information on the character string and the user identification information from the information processing device, the second circuitry of the output system further performs authentication for a user identified by the user identification information, based on the information on the character string and the user identification information, and transmits an authentication result to the output apparatus.

An embodiment of the present disclosure includes an authentication method including generating information on a character string in response to an authentication request including user identification information transmitted from an output apparatus, transmitting the information on the character string to the information processing device, performing authentication for a user identified by the user identification information in response to receiving the information on the character string and the user identification information from the output apparatus that has received the information on the character string and the user identification information from the information processing device, and transmitting an authentication result to the output apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9A and FIG. 9B (FIG. 9) are a sequence diagram illustrating an example of a process in which the user prints by using the output apparatus a print job (document) registered with the output system according to the one of the embodiments of the disclosure;

Figure 1:
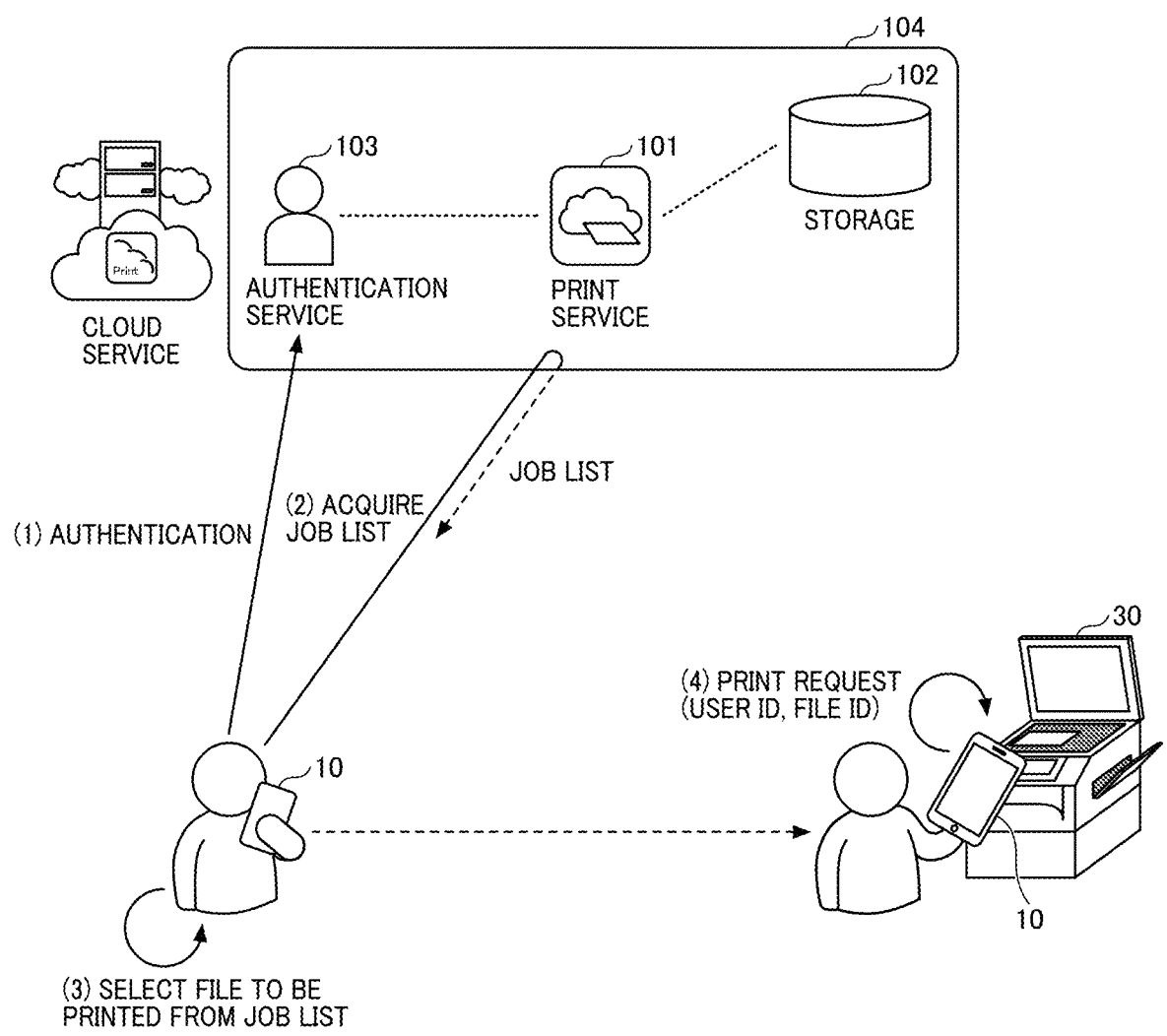
FIG. 1 is a diagram illustrating an example of operation in which an information processing device displays a print job list acquired from a print service and transmits a print request to an output apparatus according to one of the embodiments of the disclosure.

The accompanying drawings are intended to depict example embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for describing particular embodiments only and is not intended to be limiting of the present disclosure. As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Hereinafter, a description is given of an output system and an authentication method performed by the output system according to an exemplary embodiment of the disclosure, with reference to the drawings.

Overview of Output System:

FIG. 1 is a diagram illustrating an example of operation in which an information processing device 10 displays a list of print jobs (print job list) acquired from a print service 101 and transmits a print request to an output apparatus 30 according to the present embodiment. The user carries the information processing device 10 with him or her and executes a print job by pull printing using the print service 101 and the output apparatus 30.

In order to execute printing of print data corresponding to a print job stored in the print service 101 on the cloud using the output apparatus 30, each of the print service 101, the information processing device 10, and the output apparatus 30 gets information on "who" is about to carry out the printing corresponding to the print job. The authentication service 103 operating on a cloud service 104 centrally manages the information on "who (user(s))".

In addition, each print job is stored in the print service 101 according to a user operation performed by a corresponding user. The cloud service 104 receives each print job input by the corresponding user, stores the print job, and receives a print job acquisition request from the output apparatus 30.

(1) In many cases, the information processing device 10 is a device owned or used by a single user. The user operates the information processing device 10 to log in to the authentication service 103 in advance with user identification information (ID) of the user. The user ID in the description of the embodiment is identification information for identifying an individual user on the cloud.

(2) When the user has logged in to the authentication service 103, a print job list associated with the user ID identifying the user is displayable on the information processing device 10 by using the user ID from an output system 50 that is deployed on the same cloud service. The print job list is a table of information used for specifying each print job. The table of information (print job list) includes, for example, items of document name, print date and time, the number of copies, and validity period.

(3) The user checks the print job list acquired from the output system 50 on the information processing device 10 and selects a print job that the user desire to carry out.

(4) The user operates the information processing device 10 to request to the output apparatus 30 for the printing. The information processing device 10 transmits, for example, the user ID for uniquely identifying the user and a document ID (file ID) for uniquely identifying the print job to the output apparatus 30.

In the present embodiment, BLUETOOTH LOW ENERGY (BLE) (registered trademark) that is a near field wireless communication technology, is used as an information transmission method. In some embodiments, another wireless communication method is used. When the information processing device 10 and the output apparatus 30 are on the same network, the Internet Protocol (IP) address and a port number may be specified by the user, and Transmission Control Protocol (TCP)/IP communication may be used.

Figure 2:
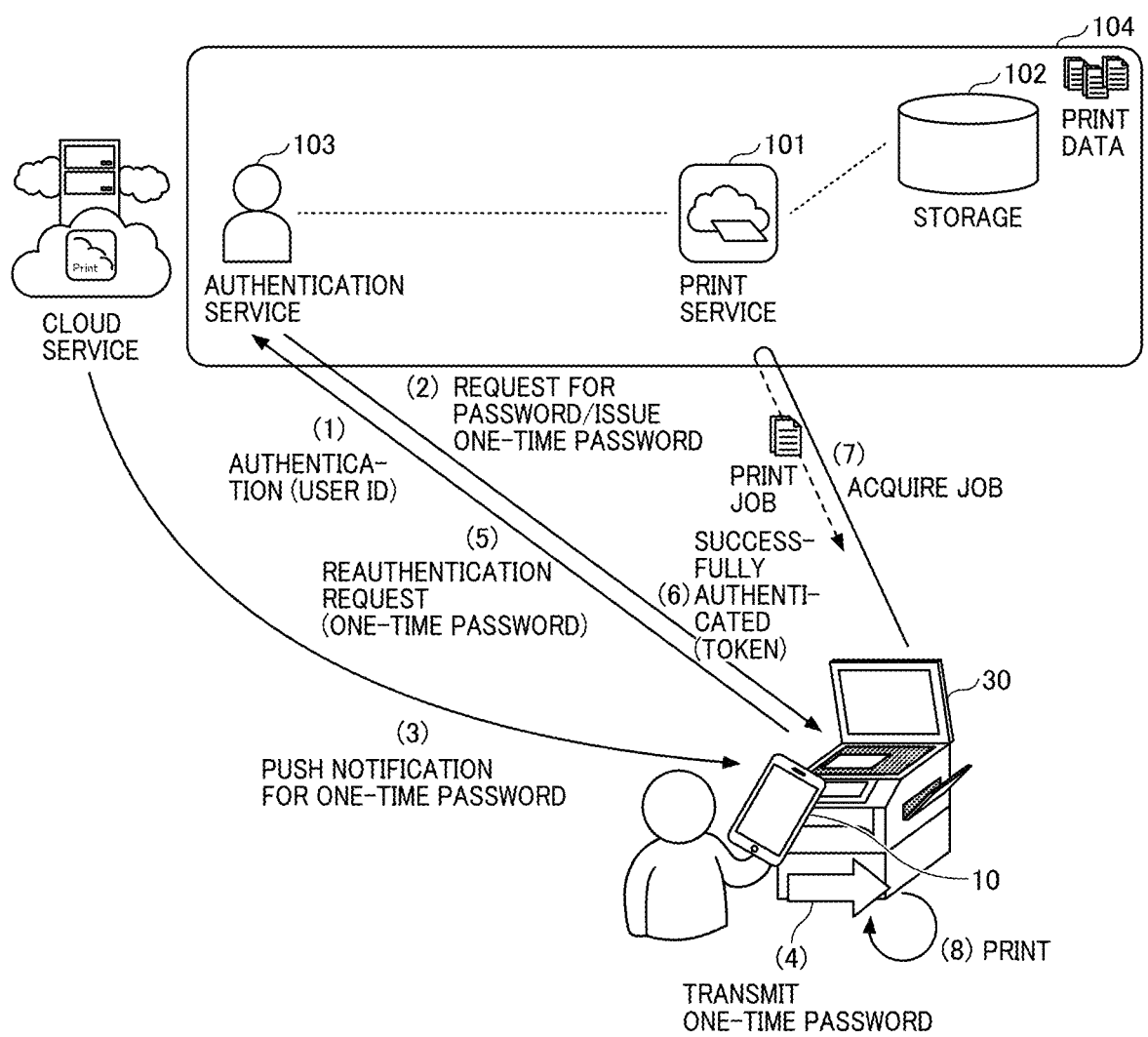
FIG. 2 is a diagram illustrating an example of operation that starts when the output apparatus requests for authentication to an authentication service and ends when execution of printing is completed, according to the one of the embodiments of the disclosure.

FIG. 2 is a diagram illustrating an example of operation that starts when the output apparatus 30 requests for authentication to an authentication service 103 and ends when execution of printing is completed, according to the present embodiment.

(1) The output apparatus 30 that has received a print request specifies a user ID received from the information processing device 10 and transmits an authentication request to the authentication service 103.

(2) Since a password is not given to the authentication request by the output apparatus 30, the authentication service 103 requests for a password to the output apparatus 30. The authentication service 103 further issues a one-time password.

(3) The authentication service 103 notifies the information processing device 10 to which the user corresponding to the user ID has logged in of the issuance of the one-time password by push-notification.

(4) The information processing device 10 transmits the received one-time password to the output apparatus 30.

(5) The output apparatus 30 transmits the one-time password received from the information processing device 10 and the user ID received with the print request to the authentication service 103, thereby requesting the authentication service 103 to perform authentication again (transmitting a reauthentication request to the authentication service 103).

(6) The authentication service 103 determines whether the one-time password and the user ID received from the output apparatus 30 are stored in association with each other. In a case where the authentication service 103 stores the same, this means that the user who has logged in to the authentication service 103 has transmitted the one-time password via the output apparatus 30, and it is determined that the user authentication is successful. The authentication service 103 transmits a token used for performing processing with authority of the logged-in user to the output apparatus 30.

(7) The output apparatus 30 acquires the print job from the output system 50 using the token.

(8) The output apparatus 30 starts executing the acquired print job (printing of print data).

As described above, the authentication service 103 issues the one-time password with respect to the user ID, and the output apparatus 30 requests for the authentication using the user ID and the one-time password transmitted from the information processing device 10 to the output apparatus 30. Accordingly, the information processing device 10 does not transmit authentication information such as a password to the output apparatus 30, and there is no risk of leakage of the authentication information. Even if the one-time password is leaked, since the number of accessible times with the one-time password by an arbitrary user is one, information to be leaked is minimized. That is, the number of use times of the one-time password is limited to one, in general. In addition, a validity period is set to the one-time password, and this also reduces the risk in case of leakage of the one-time password. In addition, the user does not touch the output apparatus 30 operated by an unspecified number of users. In addition, the user does not connect the information processing device 10 to the same network as the output apparatus 30.

Regarding Terms:

The character string information is one or more characters used for authentication. In the description of the present embodiment, a term of "one-time password" is used for representing the character string. The one-time password turns to be invalid when the authentication is successfully performed (the one-time password is valid when the authentication fails). A validity period may be set to the one-time password. When the validity period has passed, the one-time password is deleted. The character string includes information that is designable by a character code, such as numbers, alphabets, and symbols.

The token is information on user authority. The token is associated with the user who has logged in with authentication information. Alternatively, the token may include information with which the user is identifiable. When the user is identified by the token, the authority of the user, which is the user authority, (authority for the print job, for example, displaying, printing, editing, and the like) is also identified. The token may include the authority of the user.

The token is stored in both a user terminal (the information processing device 10 in the present embodiment) and the authentication service 103 (the output system 50 in the present embodiment). The token allows the user to log in without authentication information until a predetermined time has passed since the issuance of the token. The predetermined time is determined by the authentication service 103. After the predetermined time has passed, the authentication service 103 invalidates or discards the token, and the user logs in with the authentication information.

The authentication information is a predetermined arbitrary character string for notifying a computer that the user is an authorized user. The authentication information includes, for example, a password and a passcode. In addition, the authentication information includes biometric authentication information such as a fingerprint and Integrated Circuit (IC) card information held by the user, for example.

The print job is an execution unit of processing executed by the output apparatus 30 in printing document data requested to be printed. The print job includes at least the document data and may further include print settings. A job of an image forming apparatus is referred to as a print job. In other devices, a job having a name corresponding to a function of the device is executed. The document data may include not only characters but also an image or a figure, or may include an image alone.

Figure 3:
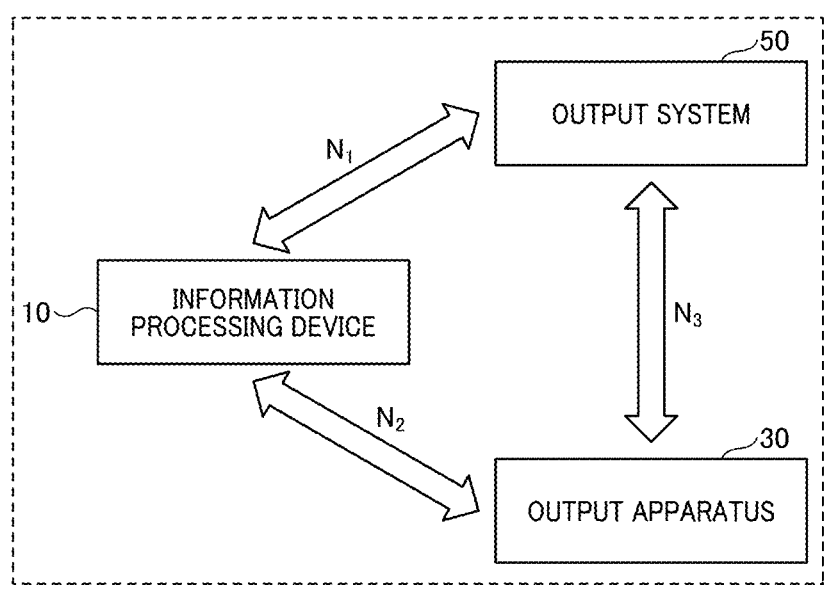
FIG. 3 is a schematic block diagram illustrating an example of a system configuration of an information processing system according to the one of the embodiments of the disclosure.

System Configuration:

FIG. 3 is a schematic block diagram illustrating an example of a system configuration of the information processing system 1 according to the present embodiment. The information processing system 1 illustrated in FIG. 3 includes the information processing device 10, the output system 50, and the output apparatus 30.

The information processing device 10 and the output system 50 communicate with each other via a network N1. The network N1 in the present embodiment is a network using public networks such as third generation (3G), fourth generation (4G), fifth generation (5G), and Long Term Evolution (LTE). The public network is a communication line connecting bases that is used by unspecified users sharing the same physical line. For example, a mobile phone network or a Personal Handy-phone System (PHS) communication network is used. The information processing device 10 may be connected to an access point via a wireless local area network (LAN) such as Wi-Fi to communicate with the output system 50 via the Internet or by wired.

The information processing device 10 and the output apparatus 30 communicate with each other via a network N2. The network N2 in the present embodiment is a network using near field wireless communication such as Near Field Communication (NFC), BLUETOOTH (registered trademark), or BLUETOOTH LOW ENERGY (registered trademark). The information processing device 10 and the output apparatus 30 may communicate with each other by TCP/IP communication. The network N2 may be infrared communication or visible light communication, for example.

The output apparatus 30 and the output system 50 communicate with each other via a network N3. The network N3 in the present embodiment may be a LAN constructed in a facility in which the output apparatus 30 and the output system 50 are installed, a Wide Area Network (WAN) having a plurality of LANs, or the Internet, for example. The network N3 may be any as long as the output apparatus 30 and the output system 50 communicates with each other. The network N3 is any one of a wired network, a wireless network, and a combination of the wired network and the wireless network. The output apparatus 30 may be connected to a public line to communicate with the output system 50.

The information processing device 10 has a function as a computer, and an application (app), which will be described later, is running, or activated. The application has a function of registering a print job in the output system 50 or acquiring (downloading) a print job and displaying the print job in a list. The information processing device 10 may have a function of editing or deleting a print job. On the information processing device 10, a general application that supports a user to generate document data or acquires document data from the Internet is running, or is activated separately from the application. The application running on the information processing device 10 has a function of causing the output apparatus 30 to print a print job stored in the output system 50 (a function of starting communication with the output apparatus 30 and causing the output system 50 to transmit the print job to the output apparatus 30).

Specifically, the information processing device 10 includes but is not limited to, a smartphone, a mobile phone, a tablet terminal, a game machine, a personal digital assistant (PDA), a digital camera, a wearable personal computer (PC), a PC, and a game machine.

The output system 50 is, for example, one or more information processing devices 10 on the Internet. The information processing device 10 on the network may be referred to as a server. The server is a computer or software that functions to provide information and a processing result in response to a request from a client.

The output system 50 stores the print job transmitted from the information processing device 10, and transmits the print job to the output apparatus 30 in response to a request from the output apparatus 30. The output system 50 may be on the Internet or may be in on-premises. When being on the Internet, the output system 50 is a system that supports cloud computing. The "cloud" is a term used when a specific hardware resource is not intended. The output system 50 may be referred to as a cloud system or a server system, for example.

The output system 50 also includes storage for storing the print jobs. The storage may be used by a service that provides users with disk space on the internet. The output system 50 may be referred to as online storage. The output system 50 may be used by both general users and companies. In a case of a company, it is not necessary to build a file server environment in-house, and the capacity is changeable according to a use purpose.

The output apparatus 30 that executes a print job includes, for example, a printer, an image forming apparatus, an image processing apparatus, a copier, a multifunction peripheral, and a Multi-function Peripheral/Product/Printer (MFP). In the present embodiment, the output apparatus 30 may be any apparatus as long as the apparatus has a printer function.

In some embodiments, the output apparatus 30 may be an apparatus that has a function of outputting data in addition to or in alternative to the printer function. The output apparatus 30 is, for example, a projector, a Head Up Display (HUD) device, an electronic whiteboard, or a digital signage. In the case of each of these devices, the output apparatus outputs (displays, reproduces, etc.) data such as data representing video, document, or music acquired from the output system 50.

In addition, the output apparatus 30 is not limited to a printer or the like as long as it is an apparatus that has a communication function. The output apparatus 30 may be, for example, an industrial machine, an imaging device, a sound collecting device, a medical device, a network home appliance, a connected car, a notebook PC, a mobile phone, a smartphone, a tablet terminal, a game machine, a Personal Digital Assistant (PDA), a digital camera, a wearable PC, or a desktop PC.

Figure 4:
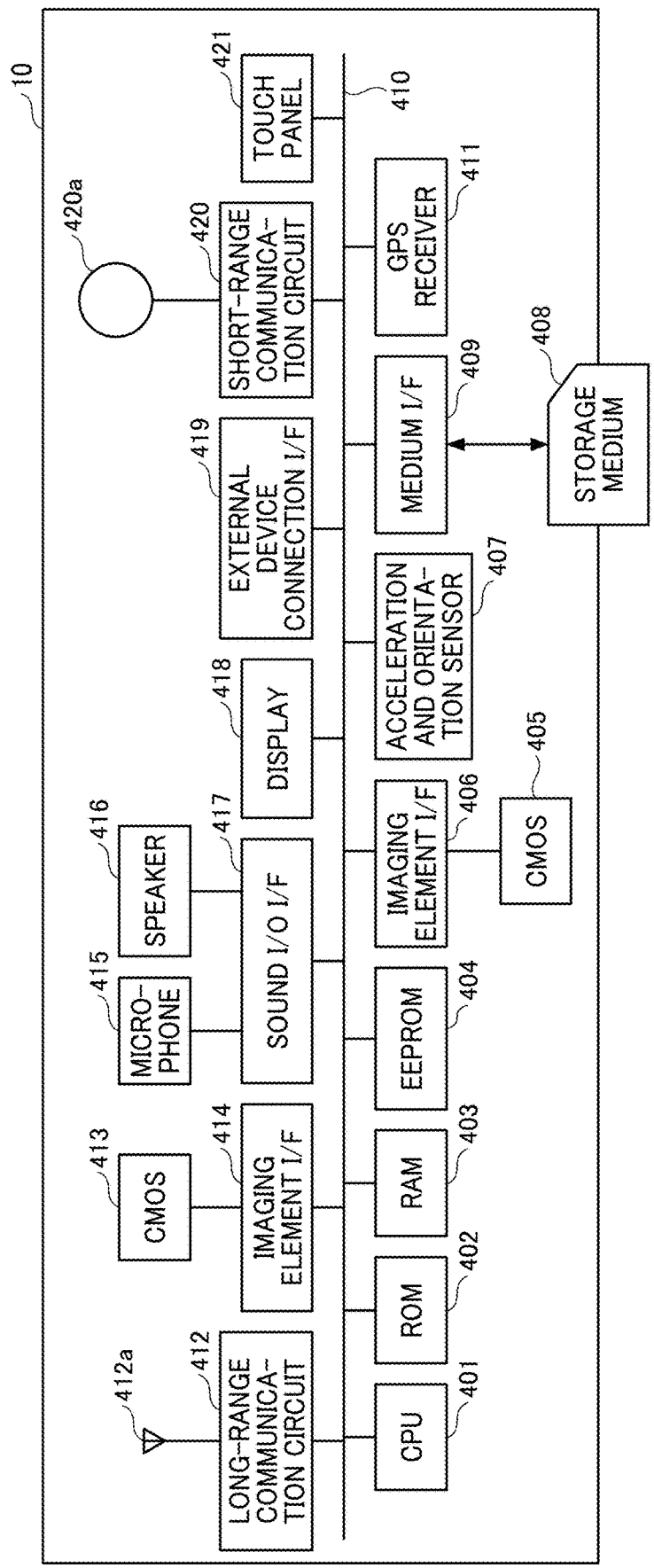
FIG. 4 is a block diagram illustrating a hardware configuration of the information processing device according to the one of the embodiments of the disclosure.
Figure 5:
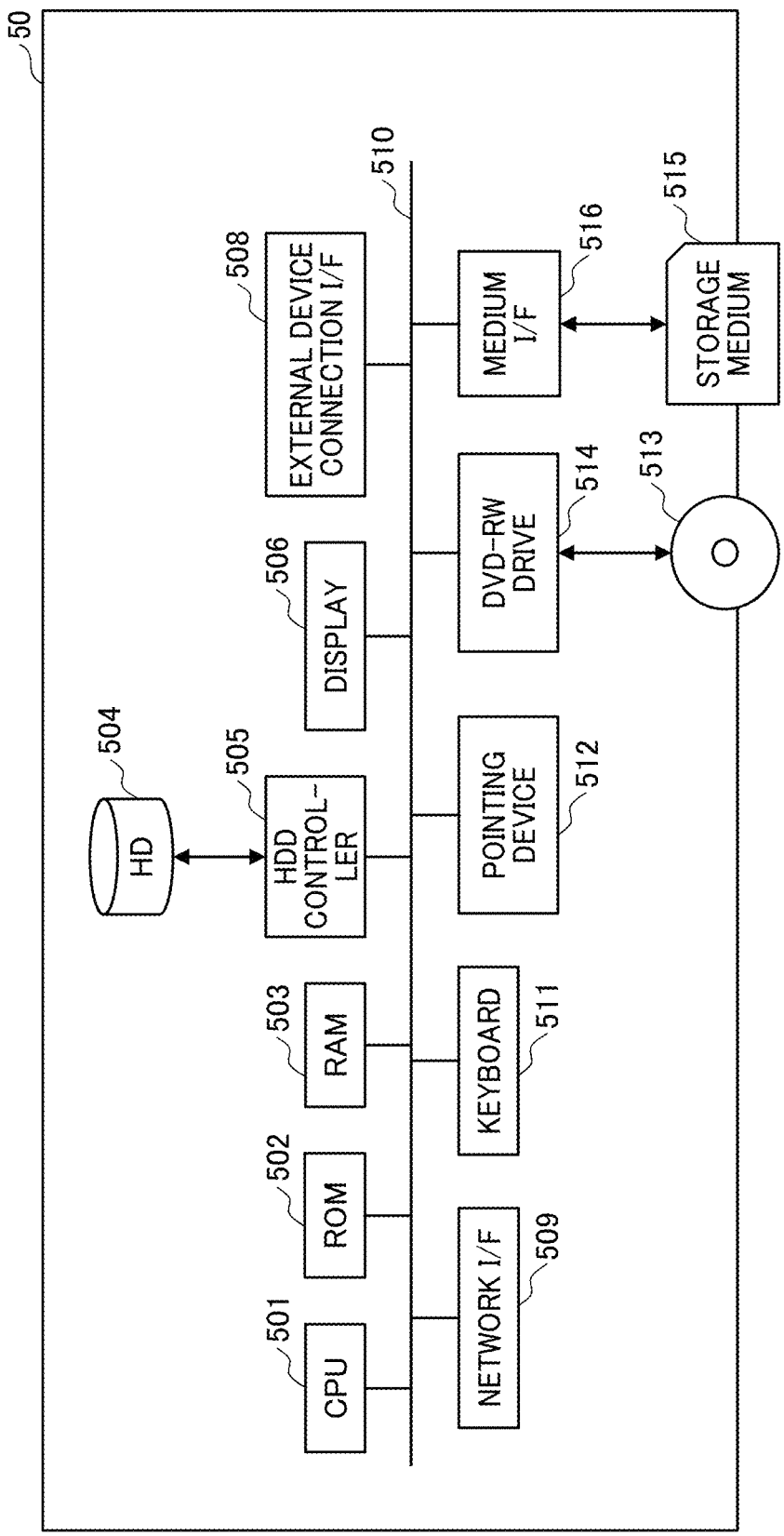
FIG. 5 is a block diagram illustrating an example of a hardware configuration of an output system according to the one of the embodiments of the disclosure.
Figure 6:
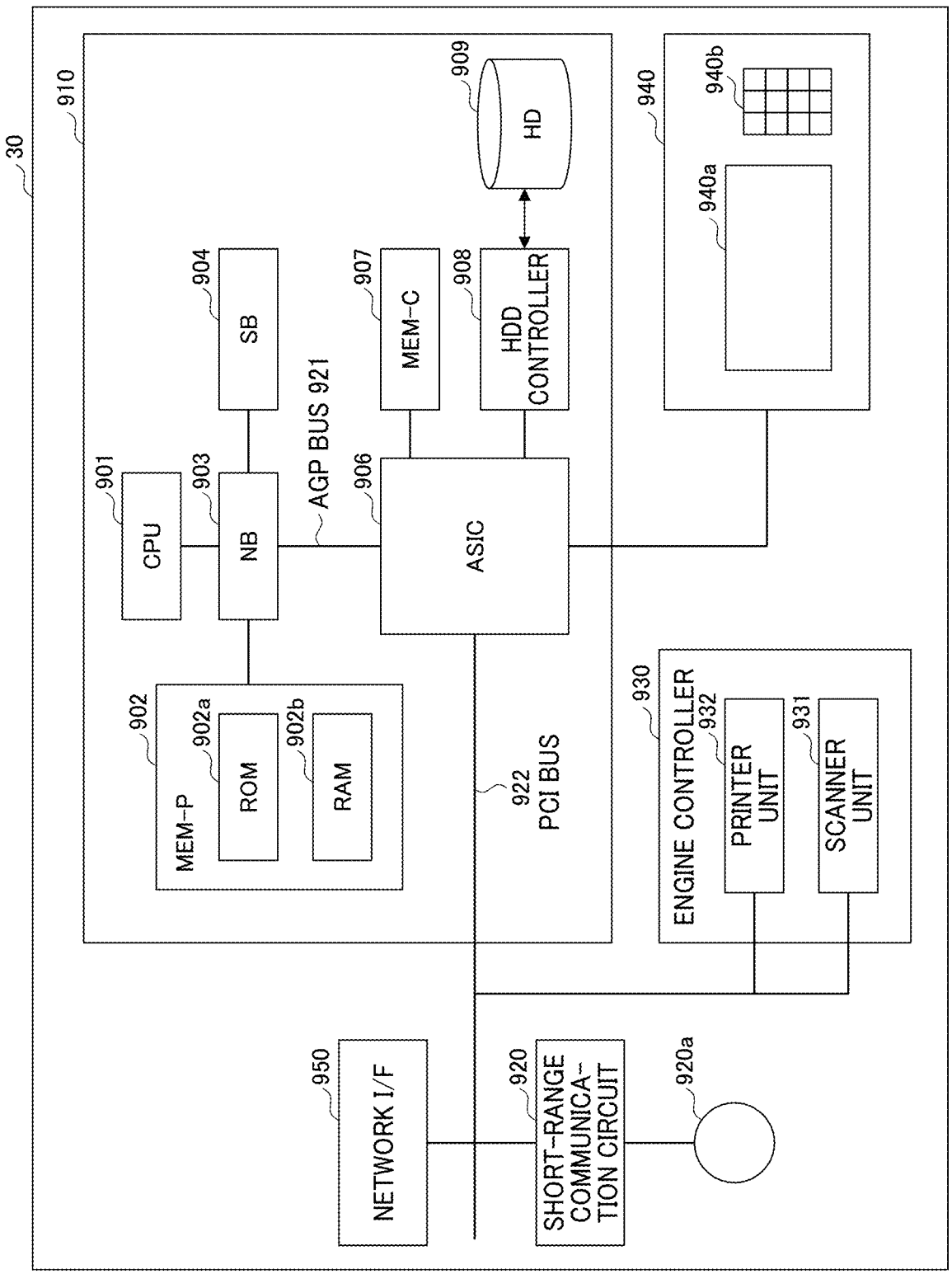
FIG. 6 is a block diagram illustrating an example of a hardware configuration of the output apparatus according to the one of the embodiments of the disclosure.

Hardware Configuration:

A description is given of a hardware configuration of the information processing system 1 according to the present embodiment with reference to FIG. 4 to FIG. 6.

Information Processing Device:

FIG. 4 is a block diagram illustrating an example of a hardware configuration of the information processing device 10 according to the present embodiment. As illustrated in FIG. 4, the information processing device 10 includes a Central Processing Unit (CPU) 401, a Read Only Memory (ROM) 402, a Random Access Memory (RAM) 403, an Electrically Erasable Programmable Read-Only Memory (EEPROM) 404, a Complementary Metal Oxide Semiconductor (CMOS) sensor 405, an imaging element interface (I/F) 406, an acceleration and orientation sensor 407, a medium I/F 409, and a Global Positioning System (GPS) receiver 411.

The CPU 401 controls the entire operation of the information processing device 10. The ROM 402 stores a program for executing the CPU 401 such as an Initial Program Loader (IPL). The RAM 403 is used as a work area for the CPU 401. The EEPROM 404 reads or writes various types of programs (applications) for the information processing device 10 under control of the CPU 401. The CMOS sensor 405 is an example of a built-in imaging device that captures an object (mainly, a self-image of a user) under control of the CPU 401 to obtain image data. The CMOS sensor may be an imaging device such as a charge coupled device (CCD) sensor. The imaging element I/F 406 is a circuit that controls driving of the CMOS sensor 405. The acceleration and orientation sensor 407 includes various sensors such as an electromagnetic compass for detecting geomagnetism, a gyrocompass, and an acceleration sensor. The medium I/F 409 controls reading or writing (storage) of data to a storage medium 408 such as a flash memory. The GPS receiver 411 receives a GPS signal from a GPS satellite.

The information processing device 10 further includes a long-range communication circuit 412, a CMOS sensor 413, an imaging element I/F 414, a microphone 415, a speaker 416, a sound input/output (I/O) I/F 417, a display 418, an external device connection I/F 419, a short-range communication circuit 420, an antenna 420*a* for the short-range communication circuit 420, and a touch panel 421.

The long-range communication circuit 412 is a circuit for communicating with other devices through the network N1. The CMOS sensor 413 is an example of a built-in imaging device for capturing an image of a subject and obtaining image data under control of the CPU 401. The imaging element I/F 414 is a circuit that controls driving of the CMOS sensor 413. The microphone 415 is a built-in circuit that converts sound into an electric signal. The speaker 416 is a built-in circuit that generates sound such as music or voice by converting an electric signal into physical vibration. The sound I/O I/F 417 is a circuit that processes sound signal input and output between the microphone 415 and the speaker 416 under control of the CPU 401. The display 418 is an example of a display device that displays an image of the object, various icons, etc. Examples of the display 418 include a liquid crystal display (LCD) and an organic electroluminescence (EL) display. The external device connection I/F 419 is an interface for connecting various external devices. The short-range communication circuit 420 is a communication circuit that communicates in compliance with the NFC or the BLUETOOTH (registered trademark), for example. The touch panel 421 is an example of an input device that is used by a user to input a user instruction to the information processing device 10 by touching a screen of the display 418.

The information processing device 10 further includes a bus line 410. The bus line 410 includes an address bus and a data bus and electrically connects the elements illustrated in FIG. 4, such as the CPU 401, to each other.

Output System:

FIG. 5 is a block diagram illustrating an example of a hardware configuration of the output system 50. As illustrated in FIG. 5, the output system 50 is implemented by a computer and includes a CPU 501, a ROM 502, a RAM 503, a hard disk (HD) 504, a hard disk drive (HDD) controller 505, a display 506, an external device connection I/F 508, a network I/F 509, a bus line 510, a keyboard 511, a pointing device 512, a digital versatile disk-rewritable (DVD-RW) drive 514, and a medium I/F 516.

The CPU 501 controls the entire operation of the output system 50. The ROM 502 stores a program such as an IPL used for executing the CPU 501. The RAM 503 is used as a work area for the CPU 501. The HD 504 stores various data such as a program. The HDD controller 505 controls reading and writing of various data from and to the HD 504 under control of the CPU 501. The display 506 displays various information such as a cursor, a menu, a window, a character, or an image. The external device connection I/F 508 is an interface for connecting to various external devices. The external device is, for example, a Universal Serial Bus (USB) memory or a printer. The network I/F 509 is an interface for performing data communication using the networks N1 and N3. The bus line 510 is an address bus or a data bus that electrically connects the elements illustrated in FIG. 5, such as the CPU 501, to each other.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The DVD-RW may be a digital versatile disc-recordable (DVD-R) or the like. The medium I/F 516 controls reading and writing (storing) of data from and to a storage medium 515 such as the flash memory.

Output Apparatus:

FIG. 6 is a block diagram illustrating a hardware configuration of the output apparatus 30 according to the present embodiment. In FIG. 6, an image forming apparatus is used as the output apparatus 30. As illustrated in FIG. 6, the output apparatus 30 includes a controller 910, a short-range communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD controller 908, and an HD 909 as a storage unit. The NB 903 and the ASIC 906 are connected through an Accelerated Graphics Port (AGP) Bus 921.

The CPU 901 is a processor that performs overall control of the output apparatus 30. The NB 903 connects the CPU 901, with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a ROM 902a as a memory that stores program and data for implementing various functions of the controller 910. The MEM-P 902 further includes a RAM 902b as a memory that deploys the program and data, or as a drawing memory that stores drawing data for printing. The program stored in the RAM 902b may be stored in any computer-readable storage (recording) medium, such as a compact disc-read only memory (CD-ROM), compact disc-recordable (CD-R), or digital versatile disc (DVD), in a file format installable or executable by the computer, for distribution.

The SB 904 connects the NB 903 with a PCI device or a peripheral device. The ASIC 906 is an integrated circuit (IC) dedicated to an image processing use, and connects the AGP bus 921, a PCI bus 922, the HDD controller 908, and the MEM-C 907. The ASIC 906 includes a PCI target, an AGP master, an arbiter (ARB) as a central processor of the ASIC 906, a memory controller for controlling the MEM-C 907, a plurality of Direct Memory Access Controllers (DMACs) capable of converting coordinates of image data with a hardware logic, and a PCI unit that transfers data between a scanner unit 931 and a printer unit 932 through the PCI bus 922. The ASIC 906 may be connected to a USB interface, or the Institute of Electrical and Electronics Engineers 1394 (IEEE1394) interface.

The MEM-C 907 is a local memory used as a buffer for image data to be copied or a code buffer. The HD 909 stores various image data, font data for printing, and form data. The HDD controller 908 reads and writes various data from and to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with the NFC or the BLUETOOTH (registered trademark), for example.

The engine controller 930 includes the scanner unit 931 and the printer unit 932. The control panel 940 includes a display panel 940a implemented by, for example, a touch panel that displays current settings or a selection screen and receives a user input and an operation panel 940b including a numeric keypad that receives set values of various image forming parameters such as image density parameter and a start key that accepts an instruction for starting copying. The controller 910 controls entire operation of the output apparatus 30. For example, the controller 910 controls drawing, communication, or user inputs to the control panel 940. The scanner unit 931 and the printer unit 932 each performs various image processing, such as error diffusion or gamma conversion.

In response to an instruction to select a specific application through the control panel 940, for example, using a mode switch key, the output apparatus 30 selectively performs a document box function, a copy function, a printer function, and a facsimile function. When the document box function is selected, the output apparatus 30 enters a document box mode. When the copy function is selected, the output apparatus 30 enters a copy mode. When the printer function is selected, the output apparatus 30 enters a printer mode. When the facsimile function is selected, the output apparatus 30 enters a facsimile mode.

The network I/F 950 is an interface for performing data communication using the network N3. The short-range communication circuit 920 and the network I/F 950 are electrically connected to the ASIC 906 through the PCI bus 922.

Figure 7:
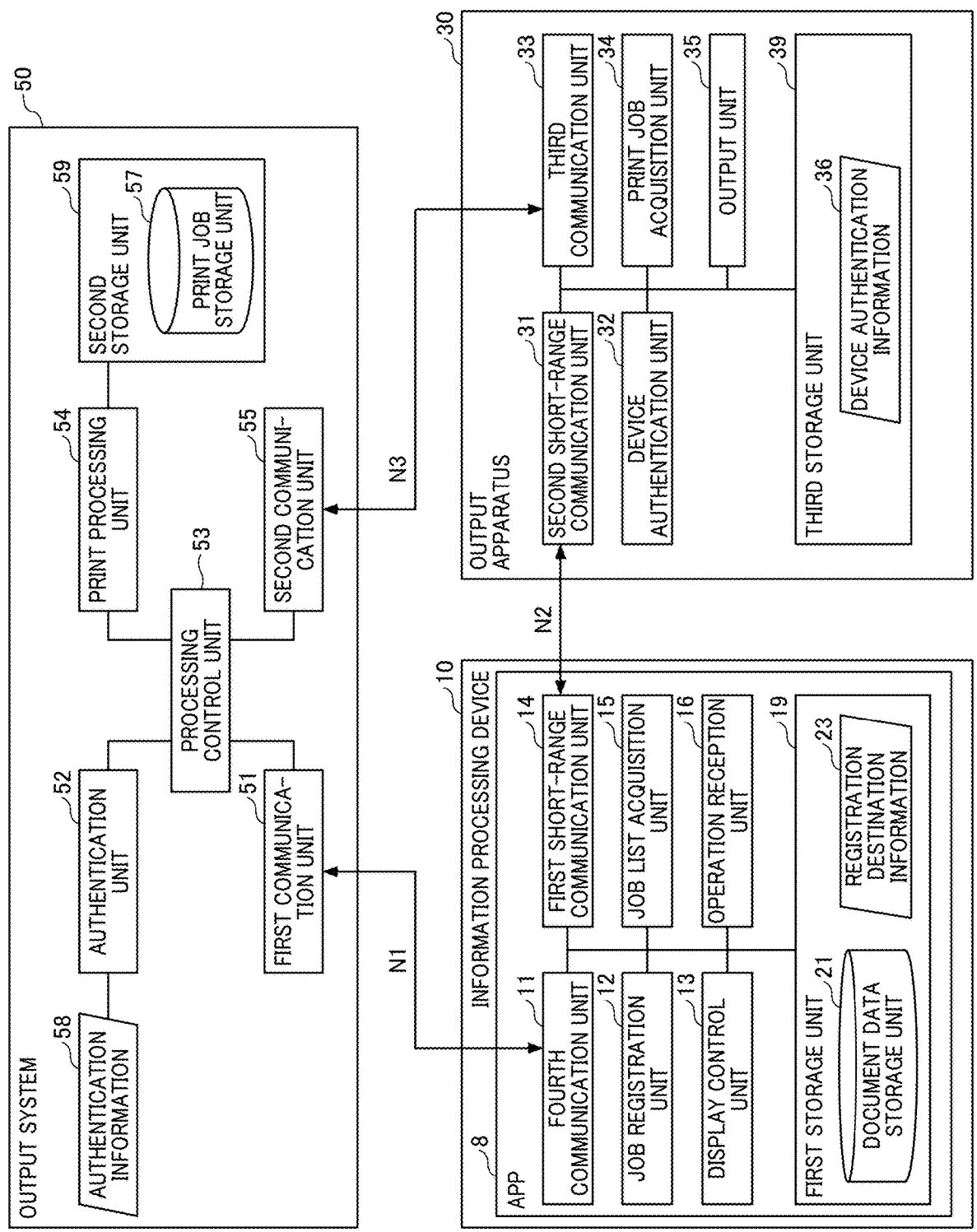
FIG. 7 is a block diagram illustrating an example of a functional configuration of the information processing device, the output system, and the output apparatus, which are included in the information processing system according to the one of the embodiments of the disclosure.

Functions of Information Processing System:

A description is given below of functions provided by the information processing system 1 with reference to FIG. 7. FIG. 7 is a block diagram illustrating an example of a functional configuration of the information processing device 10, the output system 50, and the output apparatus 30, which are included in the information processing system 1 according to the present embodiment.

Functions of Information Processing Device:

The information processing device 10 includes a fourth communication unit 11, a job registration unit 12, a display control unit 13, a first short-range communication unit 14, a job list acquisition unit 15, and an operation reception unit 16. Each of the functional units included in the information processing device 10 is a function implemented by corresponding one or more of the elements, which are illustrated in FIG. 4, operating according to an instruction from the CPU 401 according to a program (an application or a web browser) expanded from the EEPROM 404 to the RAM 403. In the present embodiment, the function units illustrated in FIG. 7 are implemented by using an application (app) 8.

The fourth communication unit 11 is connected to the network N1 and communicates with the output system 50 using registration destination information 23 stored in a first storage unit 19. The registration destination information 23 is information indicating a registration destination of the print job. A detailed description of the registration destination information 23 is given later with Table 1. As described above, the fourth communication unit 11 is connected to a public network (3G, 4G, LTE, etc.), a wireless LAN, or the like, and transmits the print job to the output system 50. In addition to or in alternative to the wireless communication, a wired LAN or the like may be used for transmitting the print job. The fourth communication unit 11 receives a print job list from the output system 50.

The job registration unit 12 transmits document data to the output system 50 as a print job to be executed (printed) by the output apparatus 30. When the print job includes print settings in addition to the document data, the job registration unit 12 transmits print settings set by the user or default print settings together with the document data. In the present embodiment, at a stage of transmitting from the information processing device 10 to the output system 50, the data, or the information, is referred to as a print job. This is for ease of explanation, and the information processing device 10 may simply transmit the document data alone to the output system 50 as the print job. In such a case in which the information processing device 10 transmits the document data alone to the output system 50 as the print job, the print settings are set by the user with the information processing device 10 or the output apparatus 30 at a time of printing. Alternatively, the default print setting is used.

The job list acquisition unit 15 acquires a list of print jobs (print job list) associated with the user ID via the fourth communication unit 11.

Figure 10:
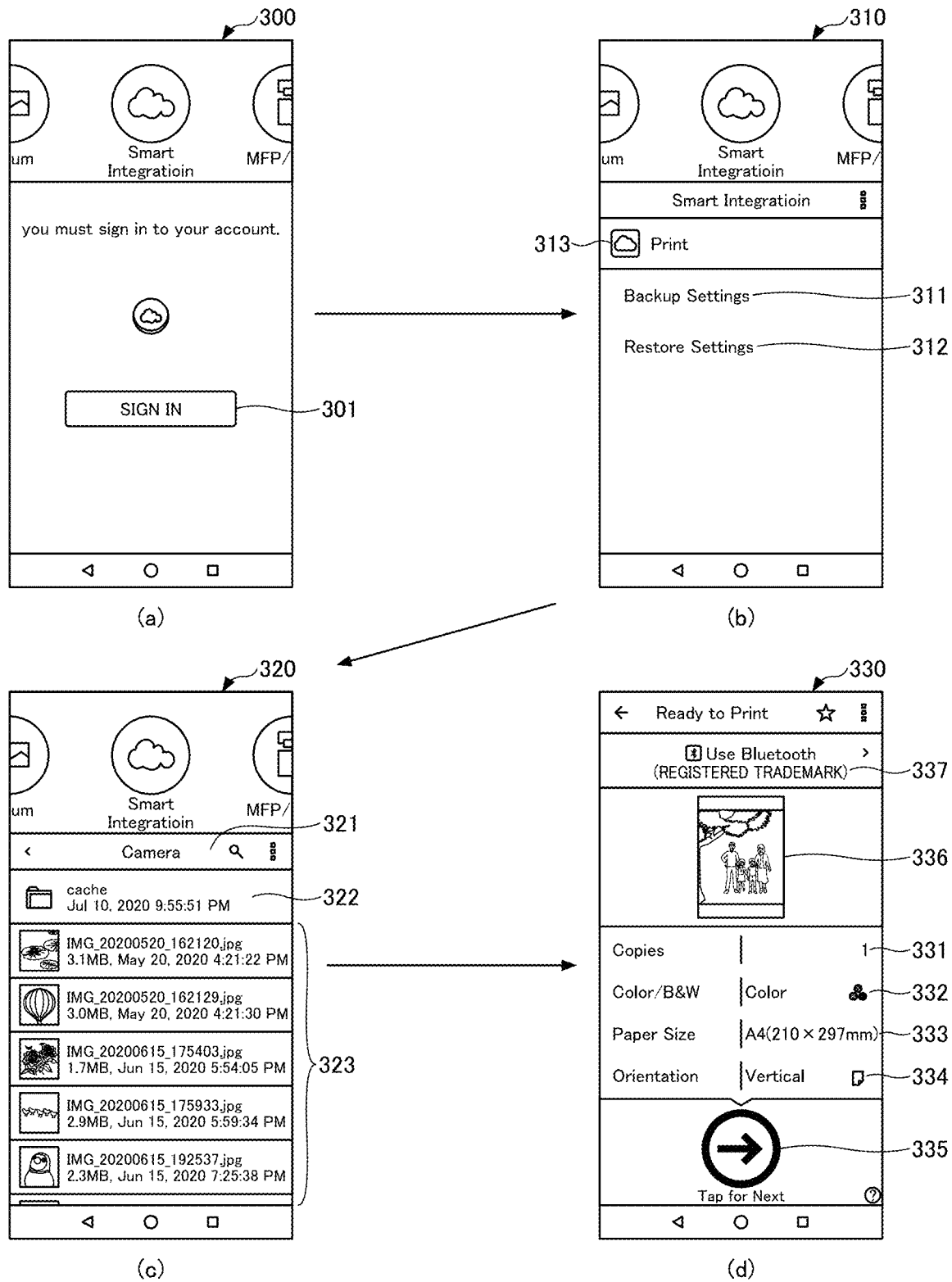
FIG. 10 is a diagram illustrating an example of a screen transition displayed on the information processing device according to the one of the embodiments of the disclosure.

The display control unit 13 generates a screen including a user interface (UI) and displays the screen on the display 418. An example of the screen is illustrated in FIG. 10. When the information processing device 10 executes the application, the information acquired from the output system 50 is arranged in a prefixed layout component to generate the screen. When the information processing device 10 executes the web browser, the screen information transmitted from the output system 50 is analyzed to be displayed on the display 418.

The operation reception unit 16 receives various operations on the information processing device 10. The operation reception unit 16 receives user operations indicating instructions such as selection of document data to be registered as a print job, selection of batch printing, selection of a print job to be executed, and start of communication with the output apparatus 30.

The first short-range communication unit 14 communicates with the output apparatus by short-range wireless communication (NFC/BLUETOOTH (registered trademark)/BLUETOOTH (registered trademark) Low Energy (LE), infrared communication, visible light communication, or the like) (an example of a fourth communication unit described in the claims). The user may cause the information processing device 10 to read a barcode such as a QR CODE (registered trademark) or a two dimensional barcode, and the fourth communication unit 11 may transmit the information to the output apparatus 30 by TCP/IP.

The information processing device 10 further includes a first storage unit 19 implemented by at least one of the EEPROM 404, the RAM 403, and the ROM 402 illustrated in FIG. 4. The first storage unit 19 includes a document data storage unit 21, and the registration destination information 23 is stored in the first storage unit 19. The document data storage unit 21 stores document data generated by a user or document data acquired from the Internet, for example. In some embodiments, the document data storage unit 21 is on a network. The document data selected by the user is registered in the output system 50 as the print job.

The registration destination information 23 is described with reference to Table 1.

TABLE 1

| | |
|---|---|
| Output System ID | 12345 |
| URL | https://... |
| Username | ichiro |
| Password | ***** |

Table 1 schematically indicates an example of the registration destination information 23. The registration destination information 23 is information including a registration destination of the print job. The registration destination information 23 includes, for example, information pieces of output system ID, Uniform Resource Locator (URL), username, and password. The output system ID is information for identifying the output system 50, namely information for uniquely identifying the output system 50. The ID is represented by, for example, either one or a combination of at least two of a name, a code, a character string, and a numeral value and used for identifying a particular object from among a plurality of objects. The ID may be referred to as identification information.

The URL is information indicating a location of a resource such as a file or a service accessible on a network and a communication method. The URL may include address information indicating a location of a resource. In the present embodiment, an address of the output system 50 is included. The username and the password are login information used by a user to log in to the output system 50.

Functions of Output System:

A description is given below of functions of the output system 50. The output system 50 includes a first communication unit 51, an authentication unit 52, a processing control unit 53, a print processing unit 54, and a second communication unit 55. Each functional unit included in the output system 50 is a function implemented by corresponding one or more of the elements, which are illustrated in FIG. 5, operating according to an instruction from the CPU 501 according to a program expanded from the HD 504 to the RAM 503.

The first communication unit 51 is connected to the network N1 and transmits and receives various kinds of information to and from the information processing device 10. In the present embodiment, the first communication unit 51 mainly receives a document from the information processing device 10 and transmits a print job list to the information processing device 10. In addition, the first communication unit 51 notifies the information processing device 10 of the one-time password or a location of the one-time password by push-notification. In addition, the first communication unit 51 receives authentication information from the information processing device 10. Since the output system 50 resides in a data center or the like, the first communication unit 51 is connected to a high-speed LAN or the like. Accordingly, the first communication unit 51 is not directly connected to the public network. The first communication unit 51 communicates with the information processing device 10 through a gateway of telephone company.

The second communication unit 55 is connected to the network N3 and transmits and receives various kinds of information to and from the output apparatus 30. In the present embodiment, the second communication unit 55 mainly receives a user ID, a document ID, and a one-time password, which are from the information processing device 10, and transmits a token and a print job to the output system 50.

The processing control unit 53 controls execution of an application in response to a request from a user. When the user requests the information processing device 10 to perform pull printing, an application corresponding to the pull printing is executed according to a user operation. The processing control unit 53 controls the application (pull printing) requested to be executed. Accordingly, the processing control unit 53 controls the overall flow of the processing according to the application selected by the user. When the application has a plurality of processes, the application may be referred to as a workflow (a series of processes). The processing control unit 53 executes a series of processes in a predetermined order.

The print processing unit 54 converts the document received from the information processing device 10 into print data to be printed (used for printing) and stores the print data in a print job storage unit 57. The print processing unit 54 transmits the print job in response to the request from the output apparatus 30. Regarding the print processing, the first communication unit 51 has a function of communicating with the information processing device 10, a function of communicating with a web browser, and a function of receiving a mail. The second communication unit 55 has a function of a port monitor (a module that transmits an output of a printer driver). The processing control unit 53 and the print processing unit 54 correspond to the print service 101 in FIG. 1.

The authentication unit 52 performs, for example, user authentication and authorization based on authentication information 58, and transmits an authentication result to the information processing device 10 or the output apparatus 30. The authentication indicates determining whether a user is a legitimate authority or not. In the case of the present embodiment, the authentication is performed to determine whether the user has the authority to use the output system 50 The authorization means giving a user authority of operation, which is operable limitation, for example, displaying, printing, and editing with respect to a print job. When the authentication is successful, the user logs in to the output system 50. To log in is an authentication act to access system resources with pre-registered authentication information when using various services on a computer or the Internet. The authentication information 58 includes, for example, a user ID and a password, an IC card number, biometric authentication information. In the present embodiment, the authentication information 58 further includes a one-time password. A detailed description of the authentication information 58 is given with reference to Table 3. The authentication unit 52 corresponds to the authentication service 103 in FIG. 1.

When an authentication request (user ID) transmitted from the output apparatus 30 does not include a password or a one-time password, the authentication unit 52 issues a one-time password. The user ID and the one-time password are stored as the authentication information 58 in association with each other (see Table 3). Then, the authentication unit 52 transmits the one-time password to the information processing device 10 via the first communication unit 51. The authentication unit 52 authenticates the user based on the consistency between the user ID and the one-time password in response to an authentication request that is requested from the output apparatus 30 by identifying the user ID and the one-time password.

The output system 50 further includes a second storage unit 59 implemented by at least one of the HD 504, the RAM 503, and the ROM 502 illustrated in FIG. 5. The second storage unit 59 includes the print job storage unit 57. Table 2 indicates information stored in the print job storage unit 57. The second storage unit 59 corresponds to storage 102 in FIG. 1.

TABLE 2

| Document ID | Tenant ID | User ID | Document Name | Print Data Path | Numbers of Pages | ... |
|---|---|---|---|---|---|---|
| 1 | 12345678 | User A | Document.doc | http://host.domain/files/xxxxxxx | 10 | |
| 2 | 987654321 | User B | Sheet.xls | http://host.domain/files/yyyyyyy | 3 | |
| 3 | 567891234 | User C | File.pdf | http://host.domain/files/zzzzzzzz | 4 | |
| 4 | 12345678 | User D | Image.img | http://host.domain/files/aaaaaaaa | 1 | |

Table 2 schematically indicates an example of the print job information stored in the print job storage unit 57. The print job information includes items of document ID, tenant ID, user ID, document name, print data path, and the number of pages, for example. The document ID is identification information for identifying a print job. One print job corresponding to a record in Table 2 corresponds to one document. The tenant ID is identification information for identifying a tenant. In the description of the present embodiment, the tenant is a customer unit, more specifically, a unit of users belonging to a group as a customer, such as a company or an organization that has a contract to use the application. The "tenant" and the "tenant ID" may be replaced by a "customer (customer unit)" and a "customer ID," respectively. The customer indicates a plurality of users, which is a group of users, who share the same software by one contract. For example, the customer may be a company, an organization, or the like. The application for which a tenant have a contract is available by each of one or more users in the tenant (customer unit), and an administrator of the tenant (called as a tenant administrator) assigns each user in the tenant a use authority for multiple software instances (applications or a package of multiple applications) that are installed in the system. The tenant ID in Table 2 identifies a tenant to which a user belongs. The user ID is identification information for identifying a user who has registered a print job. The document name is a file name of a document. The print data path indicates a location (URL on the network) where the document data is stored. The print data path may be a file path, or the document data may be stored in the print job storage unit 57. The number of pages is the number of pages of a document.

TABLE 3

| User A | One-Time Password | Token | Device Token | Password |
|---|---|---|---|---|

Table 3 is an example of the authentication information 58 managed by the authentication unit 52. In the authentication information 58, a one-time password, a token, a device token, and a password are associated with each other for each user ID. Accordingly, the authentication unit 52 authenticates each user by using each one-time password in alternative to a normal password. The user ID is identification information for identifying a user. The one-time password is represented by an arbitrary character string. Since a certain number of characters is used for the one-time password, it is difficult for a third party to specify in a short time. The authentication unit 52 deletes the one-time password (authentication information), after the authentication using the one-time password is successful. This increases probability that the user of the information processing device 10 that has acquired the one-time password succeeds in the authentication, and the other users fail to be authenticated, resulting in improvement in security. The authentication unit 52 deletes the one-time password (authentication information), after the validity period has passed even when the authentication using the one-time password is not successful. This prevents a log-in performed by a third party, even if the one-time password is leaked, as time elapses. The token is generated when the user logs in with the authentication information (user ID and password). The device token is used by push notification. The device token and the user ID are associated with each other, and the user ID and the information processing device 10 are associated with each other. A detailed description of this is given below. The password is information, which is confidential information, in general, used by the user for performing a log-in.

Functions of Output Apparatus:

A description is given below of functions of the output apparatus 30. The output apparatus 30 includes a second short-range communication unit 31, a device authentication unit 32, a third communication unit 33, a print job acquisition unit 34, and an output unit 35. Each functional unit included in the output apparatus 30 is a function implemented by corresponding one or more of the elements, which are illustrated in FIG. 6, operating according to an instruction from the CPU 901 according to a program expanded from the HD 905 to the RAM 902b.

The second short-range communication unit 31 is connected to a network N2 and communicates with the information processing device 10 by short-range wireless communication (NFC/BLUETOOTH (registered trademark)/ BLUETOOTH (registered trademark) LE, or the like). The second short-range communication unit 31 periodically transmits radio waves indicating its presence to the surroundings. When being in proximity with, or within, a range to which the radio wave is reachable, the information processing device 10 detects the radio wave, and communication is automatically started between the first short-range communication unit 14 and the second short-range communication unit 31 of the information processing device 10. In the present embodiment, the second short-range communication unit 31 receives the user ID, the document ID, and the one-time password from the information processing device 10.

The device authentication unit 32 transmits an authentication request to the output system 50, thereby cooperating with the output system 50 in terms of authentication. The authentication is actually performed by the output system 50. The device authentication unit 32 requests the output system 50 to perform the authentication by specifying the user ID received from the information processing device 10 and then, receives a request for one-time password from the output system 50. In response to the request, the device authentication unit 32 specifies the one-time password and the user ID received from the information processing device 10 to request the output system 50 to perform the authentication. When the authentication is successful, the token is received from the output system 50.

The third communication unit 33 transmits and receives various kinds of information to and from the output system 50 via the network N3. In the present embodiment, the third communication unit 33 transmits the user ID, the document ID, and the one-time password to the output system 50, and receives the token and the print job from the output system 50. The third communication unit 33 communicates with the output system 50 by a communication method (for example, a higher-level protocol such as TCP/IP and Hyper Text Transfer Protocol (HTTP)), which is different from the near field wireless communication.

The print job acquisition unit 34 transmits the token and the document ID to the output system 50 via the third communication unit 33. When the user is authenticated by the token, the print job acquisition unit 34 acquires the print job associated with the document ID from the output system 50.

The output unit 35 corresponds to a printing function, which is one of the main functions, of the output apparatus 30. The output unit 35 prints the document data on a sheet material such as paper by executing the print job acquired by the print job acquisition unit 34. Expression of "printing" ("to print") may be replaceable with "outputting" ("to output"). The print request may be referred to as an output request.

The output apparatus 30 further includes a third storage unit 39 implemented by at least one of the HD 905 and the RAM 902b illustrated in FIG. 6. The third storage unit 39 stores device authentication information 36. The device authentication information 36 is information indicating that the output apparatus 30 is arranged in the tenant and has been authenticated. The device authentication information 36 is stored in the third storage unit 39, when the tenant administrator or the like operates the output apparatus 30 to input the authentication information distributed from the vendor, and the output system 50 determines that the authentication is successful. Accordingly, even if the user successfully logs in to the output system 50, the user fails to execute printing with the output apparatus 30 that does not have the device authentication information 36.

Figure 8:
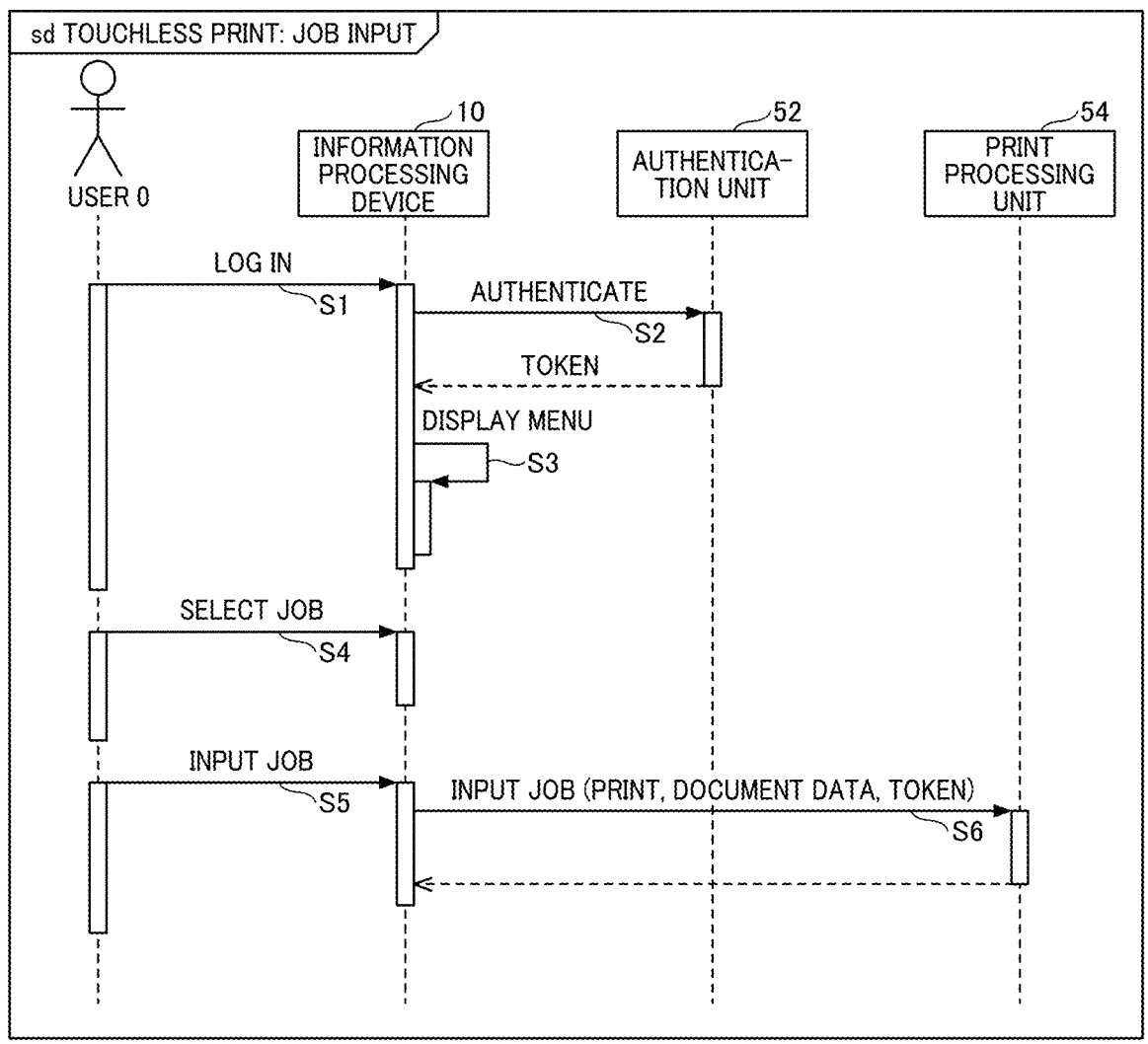
FIG. 8 is a sequence diagram illustrating an example of a process of registering a document with the output system using the information processing device operated by a user, according to the one of the embodiments of the disclosure.

Processes:

A description is given below of a process flow for registering a print job in the output system 50 according to a user operation, with reference to FIG. 8. FIG. 8 is a sequence diagram illustrating an example of a process of registering a document with the output system 50 using the information processing device 10 operated by the user according to the present embodiment. The user is to register with the output system 50 a document to be printed by using the output apparatus 30 later, or in the future.

S1: The user operates with respect to the application 8 running on the information processing device 10 to log into the output system 50 (the user inputs the authentication information or input an instruction to transmit the authentication information). The user may use a Web browser in alternative to the application 8. A port monitor is used to input a job from the Web browser. The port monitor is a module for transmitting data generated by a printer driver. The printer driver has a function of transmitting the authentication information. In addition, mail may be used to register the print job. An example of a log-in screen is illustrated in FIG. 10.

S2: The fourth communication unit 11 of the information processing device 10 transmits the authentication information to the output system 50 and requests the output system 50 for a log-in. The first communication unit 51 of the output system 50 receives the authentication information, and the authentication unit 52 performs the authentication. The authentication information includes the tenant ID, the user ID, and the password. The authentication information may be an e-mail address and a password. The log-in may be performed in cooperation with an external service using a mail address (single sign-on).

When the authentication is successful, the authentication unit 52 generates the token, and the first communication unit 51 transmits the token to the information processing device 10. The information processing device 10 stores the token in the authentication information 58 in association with the user ID. Since the output system 50 stores the token in association with the user, the user is identified by the token. While the token is valid, the information processing device 10 is authenticated not by the authentication information but by the token and communicable with the output system 50.

S3: When the log-in to the output system 50 is successful, the display control unit 13 of the information processing device 10 displays a menu screen of the application.

S4: The user presses, for example, a button for registering a print job on the menu screen to select a document (file) to be registered with the output system 50. The operation reception unit 16 of the information processing device 10 receives the user operations.

S5: When the user inputs an operation to transmit the document, the operation reception unit 16 of the information processing device 10 receives the operation.

S6: The fourth communication unit 11 of the information processing device 10 inputs the token and the selected document to the output system 50 as the print job.

Through the above-described processing, the print job is registered in the print job storage unit 57. The application holds the token, and this means that the user performs the process illustrated in FIG. 8 one time.

The operation of transmitting the document by the user may be an execution request, which is with respect to the print job, described in FIG. 9A and FIG. 9B (FIG. 9).

Pull Printing:

A description is given below of a flow of pull printing with reference to FIG. 9A and FIG. 9B (FIG. 9). FIG. 9A and FIG. 9B (FIG. 9) are a sequence diagram illustrating an example of a process in which a user prints a print job (document) registered with the output system 50 by using the output apparatus 30. When there is a document to be printed by using the output apparatus 30, the user operates the information processing device 10 to start printing. The user may perform printing without touching the output apparatus 30.

S11-S13: Processing of steps S11 to S13 in FIG. 9A is substantially the same as the processing of steps S1 to S3 in FIG. 8. When the user has already executed steps S1 to S3 (within the period in which the token is valid), steps S11 to S13 may not be performed.

S14: The user opens, or activates, a pull-print function of the application in a log-in state. The operation reception unit 16 receives the user operation of start of starting the pull printing through the menu screen. An example of the menu screen, a screen (b), is illustrated in FIG. 10.

S15: The fourth communication unit 11 transmits a job list request to the output system 50 to request for a job list by using the token, which is received from the output system 50 at the time of the log-in.

S16: The first communication unit 51 of the output system 50 receives the job list request with the token, and the print processing unit 54 acquires the user ID associated with the token from the authentication unit 52. The print processing unit 54 acquires each print job associated with the user ID from the print job storage unit 57. The first communication unit 51 responds to the information processing device 10 with the print job list. Regarding the print job list, the information processing device 10 displays on a screen bibliographic information, such as for example, a document name a print date, the number of copies, and a thumbnail image. The print job list is a table for identifying a print job to be executed by the user.

S17: The fourth communication unit 11 of the information processing device 10 receives the print job list, and the display control unit 13 displays a job list screen displaying the print job list. An example of the job list screen, a screen (c) is illustrated in FIG. 10.

S18: The user selects a print job to be executed. The operation reception unit 16 receives the selection.

S19: The user may additionally designate the print settings and then instruct the printing. An example of screen of setting print conditions, a screen (d), is illustrated in FIG. 10.

S20: Next, the user presses a communication start button to establish a communication between the information processing device 10 and the output apparatus 30. The operation reception unit 16 receives the print instruction. The information processing device 10 may automatically start the communication without receiving the user operation of pressing the communication start button.

The period of time from the selection of the print job in step S18 to the communication in step S20 is not particularly limited. Accordingly, the user may select the print job at any place.

Figure 11:
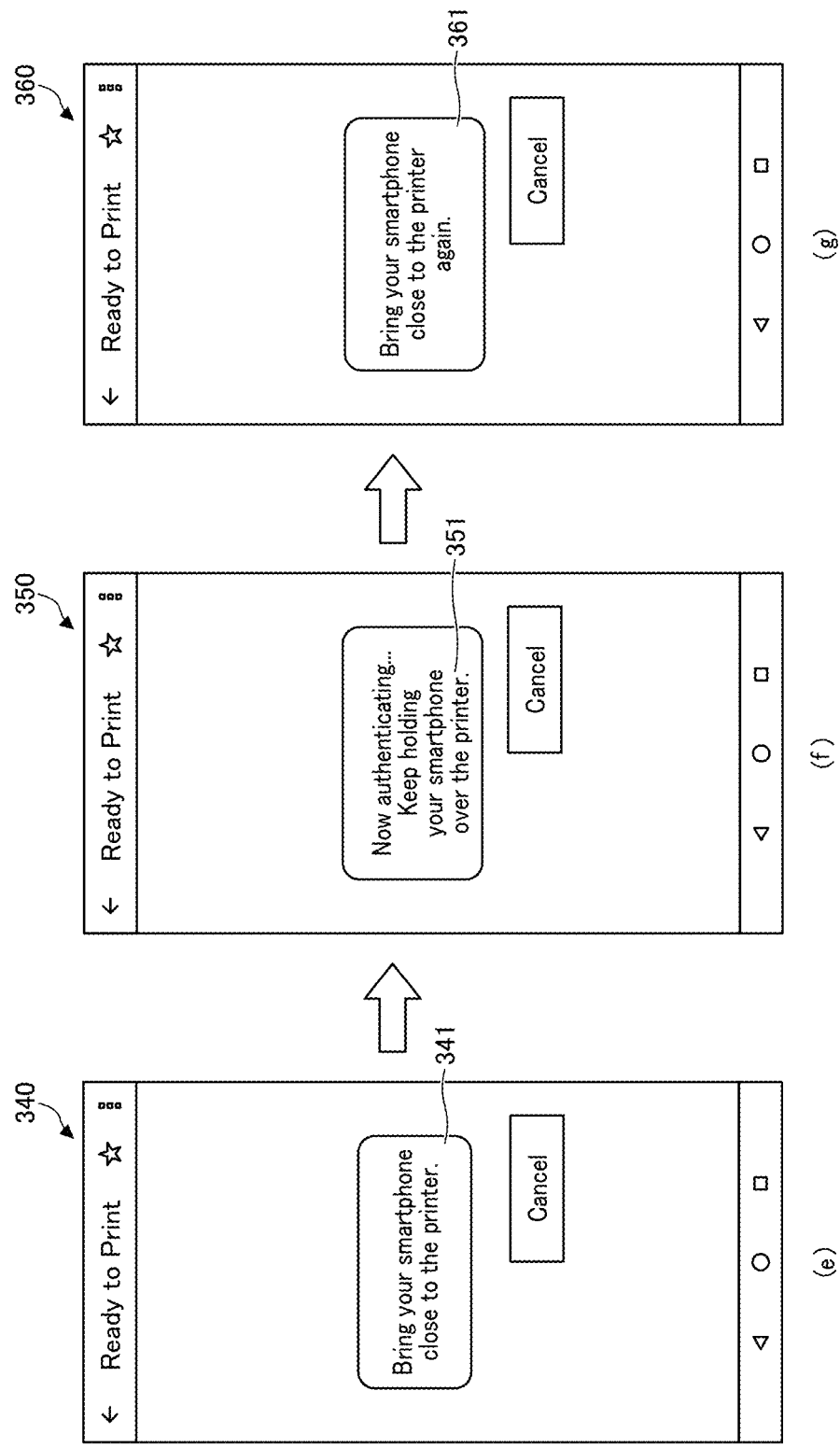
FIG. 11 is a diagram illustrating another example of a screen transition displayed on the information processing device according to the one of the embodiments of the disclosure.

S21: When the user presses the communication start button, the information processing device 10 displays a screen (search screen) indicating that the output apparatus 30 is being searched. An example of the search screen, a screen (e) is illustrated in FIG. 11. The first short-range communication unit 14 searches for the output apparatus 30 being in proximity (close) to the information processing device 10. This "being in proximity to" means that the radio wave intensity is equal to or greater than a threshold value. In the case of BLUETOOTH LOW ENERGY (registered trademark), pairing (exchange of keys for data encryption between a central and a peripheral) is not performed depending on the design, and the central and the peripheral are connectable to each other when their radio waves reach each other. In the case of general BLUETOOTH (registered trademark), it is assumed that both have already been paired.

S22: When the first short-range communication unit 14 detects a nearby communicable output apparatus 30, the information processing device 10 starts performing authentication. An example of an authenticating screen (f) is illustrated in FIG. 11. The first short-range communication unit 14 transmits a print request to the output apparatus 30. With the print request, that the information processing device 10 transmits, to the second short-range communication unit 31 of the output apparatus 30, information indicating that "the user having the user ID is about to execute the print job having the document ID". Accordingly, the document ID and the user ID are transmitted. In addition, print settings may be transmitted.

When the first short-range communication unit 14 and the second short-range communication unit 31 communicate with each other by BLUETOOTH LOW ENERGY (registered trademark) in a non-contact manner, setting may not be performed each time of printing, resulting in improvement of convenience. Even when BLUETOOTH LOW ENERGY (registered trademark) is used, the data to be transmitted is the user ID and the document ID. This indicates that it is difficult for a third party to access the print job even if the user ID and the document ID are leaked.

In the present embodiment, the transmission method may be any technique as long as wireless communication is performable with the technique. A description of examples of the transmission method is given below. The transmission method may be NFC. In the case of NFC, the risk of information leakage is low because the communication distance is short. However, when communication is interrupted, the user holds the information processing device 10 over the output apparatus 30 again. In using BLUETOOTH LOW ENERGY (registered trademark), if the distance between the information processing device 10 and the output apparatus 30 is about several meters, the information processing device 10 and the output apparatus 30 may maintain communication. The transmission method may be TCP/IP communication through a wireless LAN. The information processing device 10 reads a QR CODE (registered trademark) attached to the output apparatus 30, and decodes an IP address, a port number, a service set identifier (SSID) of an access point of a wireless LAN, and a password of the access point, each of which is associated with the output apparatus 30. In this case, the information processing device 10 and the output apparatus 30 are connected to the same network to communicate with each other.

Figure 12A:
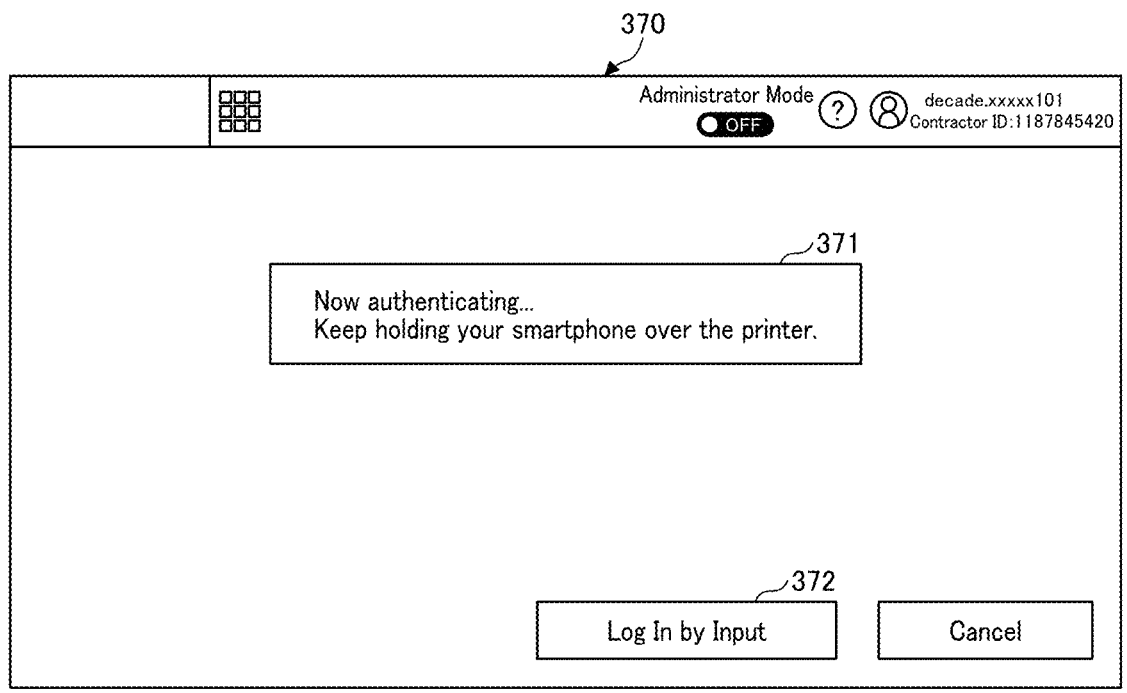
FIG. 12A and FIG. 12B are diagrams illustrating, respectively, an example of an authenticating screen and an example of a log-in screen that are displayed when the output apparatus receives the print request from the information processing device according to the one of the embodiments of the disclosure.

S23: When the second short-range communication unit 31 of the output apparatus 30 starts communication with the information processing device 10, the output apparatus 30 starts performing authentication. FIG. 12A is a diagram illustrating an example of an authenticating screen, according to the present embodiment. The second short-range communication unit 31 of the output apparatus 30 receives the print request, and passes the received user ID, document ID, and the print settings to the print job acquisition unit 34.

S24: In order to acquire the print job, authentication whether the request source (in this case, the user) is an authorized user is to be performed, and the print job acquisition unit 34 specifies the user ID and passes an authentication request to the device authentication unit 32 with the specified user ID.

S25: Upon receiving the authentication request, the device authentication unit 32 requests the output system 50 to perform authentication via the third communication unit 33. At this time, since the device authentication unit 32 has the user ID, the device authentication unit 32 transmits the user ID to the output system 50.

The second communication unit 55 of the output system 50 receives an authentication request. The authentication unit 52 attempts to perform authentication using the user ID, but since there is no password (or one-time password), the authentication is failed. Therefore, the second communication unit 55 transmits a request for a password (or a one-time password) and an authentication result (authentication failure) to the output apparatus 30.

S26: Since no password is transmitted from the output apparatus 30, the authentication unit 52 issues a one-time password. The authentication unit 52 stores the one-time password in the authentication information 58 in association with the user ID specified by the authentication request. The one-time password is information indicating that the user is the request source.

S27: The first communication unit 51 of the output system 50 specifies the user ID that has already been authenticated (the token has been generated) to transmit a push notification to the application.

In the sequence diagram illustrated in FIG. 9B, the one-time password is included in the push notification. However, in order to improve the security, the first communication unit 51 may not include the one-time password in the push notification. In this case (in order to improve the security), the authentication unit 52 transmits, via the first communication unit 51, a URL (Application Programming Interface (API) endpoint) to the information processing device 10. With respect to accessing the URL, a communication protocol with which the communication is encrypted (Hyper Text Transfer Protocol Secure (HTTPS) communication) by Secure Sockets Layer (SSL) or Transport Layer Security (TLS) may be used. The authentication unit 52 authenticates with respect to accessing the URL by using the token. When connecting to the URL prepared by the authentication unit 52, the information processing device 10 transmits the token. Then, when the authentication unit 52 determines that the token matches a token associated with the URL, the information processing device 10 receives (may download) the one-time password.

A brief description of the push notification is given below.

a) An application of the information processing device 10 is given an ID called a device token from a distribution source of the application in advance.

b) A distribution server managed by the Operating System (OS) manufacturer of the information processing device 10 manages a correspondence table between a device token and an individual identification number of the information processing device 10 (or the OS).

c) The output system 50 holds the device token of the application in association with the user ID of the logged-in user.

d) In a case where the push notification is desired to be sent to the user, the output system 50 requests the delivery server to deliver the push notification by specifying the device token and a message (for example, the one-time password or the URL) associated with the user ID.

e) The distribution server that has received the request distributes the push notification with respect to the individual identification number associated with the specified device token.

The method of delivering the push notification may differ depending on the OS manufacturer, and the above description is an example.

S28: When the fourth communication unit 11 of the information processing device receives the one-time password, the fourth communication unit 11 requests the first short-range communication unit 14 to transmit the password. The first short-range communication unit 14 transmits the one-time password to the output apparatus 30.

If the communication between the first short-range communication unit 14 and the second short-range communication unit 31 is interrupted, the first short-range communication unit 14 of the information processing device 10 searches for a nearby communicable output apparatus 30 again. When the first short-range communication unit 14 and the second short-range communication unit 31 keeps the communication, the information processing device 10 does not search for a nearby communicable output apparatus 30 again. When the communication is interrupted during the authentication with the screen (f) illustrated in FIG. 11, the information processing device 10 displays a reconnection screen (g) illustrated in FIG. 11.

S29: The second short-range communication unit 31 of the output apparatus 30 receives the one-time password and passes the one-time password to the device authentication unit 32. When not receiving the one-time password within a predetermined period of time from the reception of the print request in step S22, the output apparatus 30 may invalidate the print request (discard the user ID and the document ID, and determine that there is not the print request). This reduces a wait time of the output apparatus 30, or prevents the output apparatus 30 from waiting endlessly. The time taken from the reception of the print request of step S22 to the one-time password is depending on the communication environment, in general, within several seconds. Accordingly, the predetermined time may be, for example, about 30 seconds.

S30: After transmitting the one-time password, the first short-range communication unit 14 of the information processing device 10 disconnects from the communication.

S31: The device authentication unit 32 specifies the one-time password requested from the output system 50 and the user ID acquired in step S22, and again requests the output system 50 to perform the authentication again. The output apparatus 30 may receive the user ID again.

The second communication unit 55 of the output system 50 receives the authentication request having the specified one-time password and the user ID, and passes the authentication request to the authentication unit 52. The authentication unit 52 determines authentication success or authentication failure according to whether a pair of the one-time password and the user ID is stored in the authentication information 58. When the authentication is successful, the authentication unit 52 deletes the one-time password of the authentication information 58. When the authentication is successful, the second communication unit 55 of the output system 50 specifies the token associated with the user ID and transmits the authentication result (successful authentication) to the output apparatus 30. By using the HTTPS communication to transmit the token, the probability of leakage of the token may be reduced. The token is the same as that acquired by the application in the authentication success of FIG. 8.

S32: The device authentication unit 32 passes the token to the print job acquisition unit 34.

S33: The print job acquisition unit 34 requests to the output system 50 for the print job (transmits a print job request (data output request)) using the token and the document ID. The second communication unit 55 of the output system 50 receives the print job request (data output request), and the authentication unit 52 determines that the request is from an authorized user because the token is registered in the authentication information 58. The print processing unit 54 acquires the print job associated with the document ID from the print job storage unit 57 and transmits the print job to the output apparatus 30 via the second communication unit 55.

S34: The print job acquisition unit 34 passes the acquired print job to the output unit 35.

S35: The output unit 35 executes the print job. That is, the output unit 35 prints the print data on a sheet.

S36: The output unit 35 transmits print completion (sheet ejection) to the mail address specified by the user ID by e-mail, for example. This allows the user to know the print completion and the user acquires the print result.

Examples of Screens:

FIG. 10 is a diagram illustrating an example of a screen transition displayed on the information processing device 10, according to the present embodiment. The screen (a) illustrate in FIG. 10 is an example of a log-in screen 300. The log-in screen 300 includes a log-in button 301. When the user presses the log-in button 301, the information processing device 10 displays a screen for displaying a mail address and a password. When the user transmits the correct mail address and password to the output system 50, the user successfully logs in.

The screen (b) illustrated in FIG. 10 is an example of a menu screen 310 displayed by the information processing device 10 after the log-in. The menu screen 310 includes a backup setting button 311, a restore setting button 312, and a print button 313. The backup setting button 311 is a button for the user to make settings related to a backup of a document file. The restore setting button 312 is a button for the user to make settings related to restoration of the document file (to restore from the copied data when the document file is lost).

The print button 313 is a button pressed by the user to start pull printing. When the print button 313 is pressed, the information processing device 10 transmits the token to the output system 50, and the information processing device 10 receives the print job list associated with the user.

The screen (c) illustrated in FIG. 10 is an example of a job list screen 320 displayed when the print button 313 is pressed. The information processing device 10 displays the job list screen 320 including a search field 321, a folder 322, and a document list 323, which is a list of documents stored in the folder 322. The user may select an arbitrary document file from the document list 323. In the screen (c) illustrated in FIG. 10, each document is image data, but the documents may be files generated by various applications.

The screen (d) illustrated in FIG. 10 is an example of a print condition setting screen 330 displayed by the information processing device 10 when a document is selected. The print condition setting screen 330 displays an image 336 of the document selected in the screen (c) of FIG. 10. The print condition setting screen 330 includes a copy number field 331, a color/monochrome field 332, a paper size field 333, a print orientation field 334, a setting item switching button 335, and a communication start button 337. The copy number field 331 is a field in which the user sets the number of copies to be printed. The Color/monochrome field 332 is a field in which the user sets color printing or monochrome printing. The paper size field 333 is a field in which the user sets a size of paper sheet. The print orientation field 334 is a field in which the user sets an orientation of the sheet. The setting item switching button 335 is a button for switching setting items by the user. The information processing device 10 other different setting items. The communication start button 337 is a button for causing the information processing device 10 to start communication with the output apparatus 30.

The screen (e) illustrated in FIG. 11 is an example of a search screen 340 displayed by the information processing device 10 when the communication start button 337 is pressed on the screen (d) illustrated in FIG. 10. The search screen 340 includes a message 341, for example, "Bring your smartphone close to the printer". The user may hold the information processing device 10 over the output apparatus 30 in accordance with the message 341.

The screen (f) illustrated in FIG. 11 is an example of an authenticating screen 350 displayed by the information processing device 10 when the information processing device 10 starts the communication with the output apparatus 30. The authenticating screen 350 includes a message 351, for example, "Now authenticating . . . Keep holding your smartphone over the printer." This message allows the user to know that the information processing device is communicating with the output apparatus 30 and the user should keep holding the information processing device 10 over the output apparatus 30. The authenticating screen 350 ends when the information processing device 10 transmits the one-time password to the output apparatus 30, and the screen changes to, for example, the job list screen 320 again.

The screen (g) illustrated in FIG. 11 is an example of a reconnection screen 360 displayed when the communication between the information processing device 10 and the output apparatus 30 is interrupted while the authenticating screen 350 is being displayed (before the one-time password is transmitted). The reconnection screen 360 includes a message 361, for example, "Bring your smartphone close to the printer again". The message 361 allows the user to know that the information processing device 10 should be held over the output apparatus 30.

FIG. 12A is a diagram illustrating an example of an authenticating screen displayed by the output apparatus 30 when the output apparatus 30 receives the print request from the information processing device 10, according to the present embodiment. The authentication screen 370 displays a message 371, for example, "Now authenticating . . . Keep holding your smartphone over the printer." This message allows the user to know that the information processing device 10 is communicating with the output apparatus 30 and the user should keep holding the information processing device 10 over the output apparatus 30. When the output apparatus 30 receives the authentication success (token), the authenticating screen 370 transitions to, for example, a screen indicating that printing is being performed.

The authenticating screen 370 includes a log-in button 372. When the user presses the log-in button 372, a log-in screen 380 illustrated in FIG. 12B is displayed.

Figure 12B:
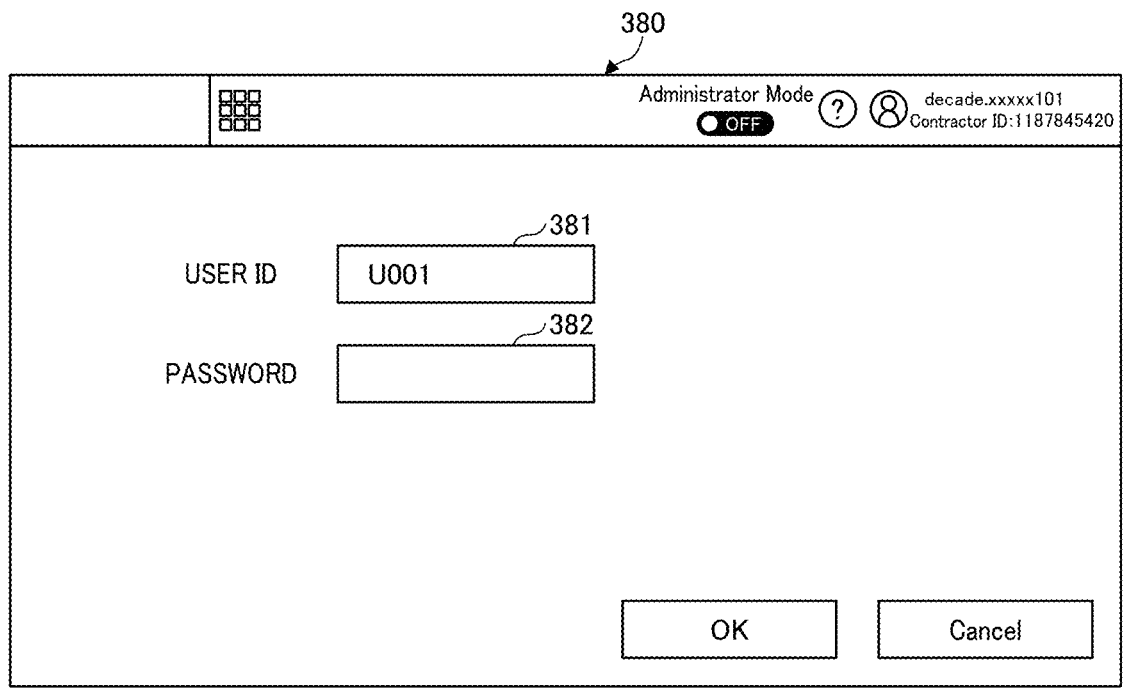

FIG. 12B is a diagram illustrating an example of the log-in screen 380 displayed by the output apparatus 30 according to the present embodiment. The log-in screen 380 includes a user ID field 381 and a password field 382. The user ID field 381 displays a user ID. Since the information processing device 10 has already transmitted the user ID to the output apparatus 30, the user does not input the user ID. The password field 382 is a field in which the user inputs a password. Accordingly, even when the information processing device 10 and the output apparatus 30 fail to communicate with each other or the output apparatus 30 fails to receive the token, the user performs a log-in by manual operation (inputting information via the screen).

Figure 13:
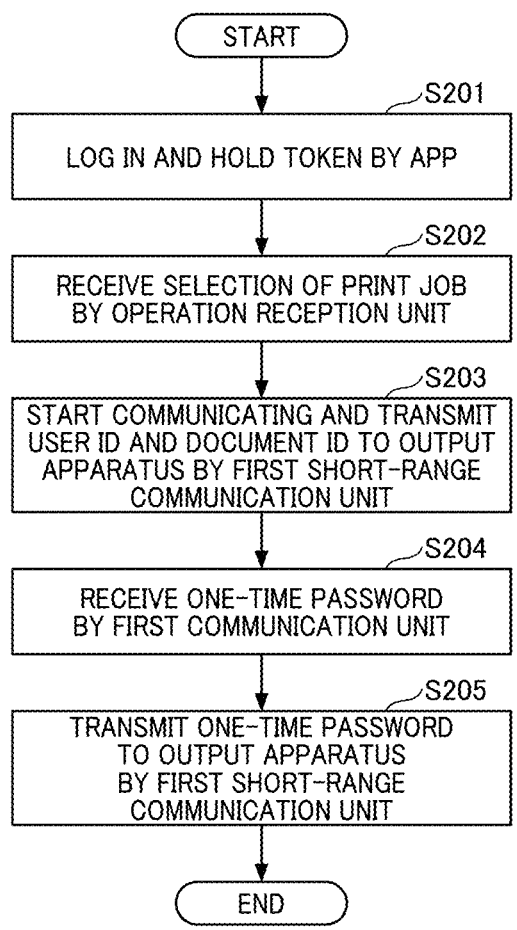
FIG. 13 is an example of a flowchart illustrating a process performed by the information processing device according the one of the embodiments of the disclosure.

Processes Performed by Information Processing Device and Output Apparatus:

FIG. 13 is an example of a flowchart illustrating a process performed by the information processing device 10 according to the present embodiment. Some parts of the process may overlap the sequence diagram of FIG. 9A and FIG. 9B (FIG. 9).

The application of the information processing device 10 logs into the output system 50 in response to a user operation and holds the token (S201).

The operation reception unit 16 receives selection of the print job within the validity period of the token (S202). In response to a user operation, the first short-range communication unit 14 starts communication with the output apparatus 30 and transmits the user ID and the document ID (and also the print settings) to the output apparatus 30 (S203).

Since the output system 50 does not perform authentication based on the user ID alone, the one-time password is issued, and the fourth communication unit 11 receives the one-time password by push notification or the like (S204). The time taken from step S203 to step S204 is assumed to be within several seconds. When the information processing device does not receive the one-time password within the predetermined time, an error may be displayed.

The first short-range communication unit 14 transmits the one-time password to the output apparatus 30 (S205). As described above, the user operating the information processing device 10 perform the user operations of selecting the print job and starting communication with the output apparatus 30 without touching the output apparatus 30.

Figure 14:
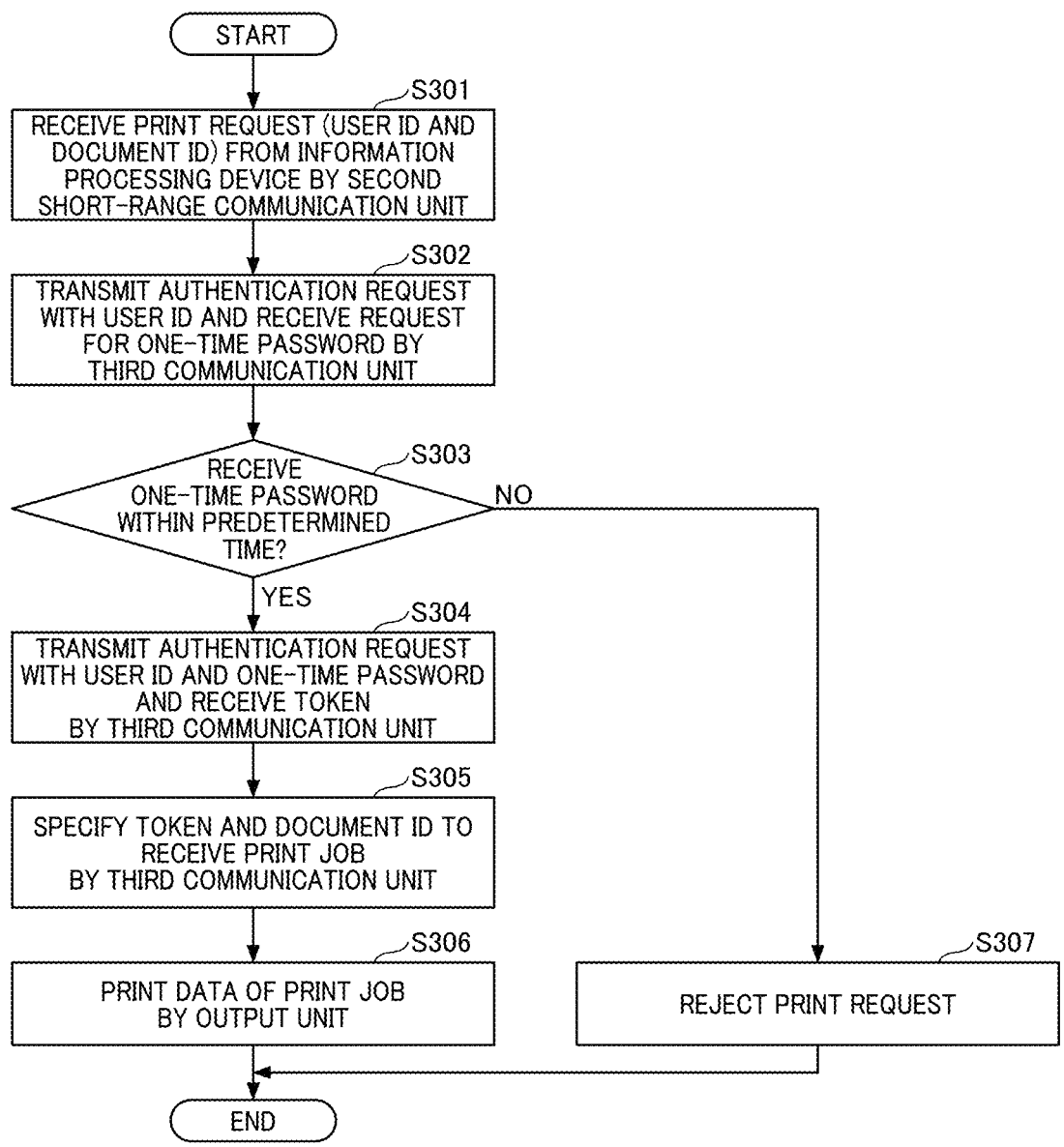
FIG. 14 is an example of a flowchart illustrating an example of a process performed by the output apparatus according the one of the embodiments of the disclosure.

FIG. 14 is an example of a flowchart illustrating an example of a process performed by the output apparatus 30. Some parts of the process may overlap the sequence diagram of FIG. 9A and FIG. 9B (FIG. 9).

The second short-range communication unit 31 receives the print request (user ID and document ID) from the information processing device 10 (S301). Accordingly, pull printing is started.

In response to the print request, the device authentication unit 32 transmits the user ID and the document ID to the output system 50 via the third communication unit 33 to request to perform authentication. However, there is no password, the device authentication unit 32 receives the request for a password (or a one-time password) from the output system 50 (S302).

The device authentication unit 32 monitors whether the one-time password is received within the predetermined time after the third communication unit 33 transmits the user ID and the document ID to the output system 50 (S303).

When the second short-range communication unit 31 receives the one-time password, the third communication unit 33 transmits the user ID and the one-time password to request to perform authentication and then receives the token (S304).

The third communication unit 33 requests for the print job by specifying the token and the document ID (namely, transmits a data output request), and receives the print job (S305). The output unit 35 executes the print job to print the print data of the print job (S306).

On the other hand, when the second short-range communication unit 31 does not receive the one-time password within the predetermined period, the print job acquisition unit 34 invalidates the print request (S307). That is, the print job acquisition unit 34 discards the user ID and the document ID and there is not the print request.

As described above, the user operates the output apparatus 30 by holding the information processing device 10 over the output apparatus 30 without touching the output apparatus 30.

As described above, in the present embodiment, the authentication unit 52 issues the one-time password for the user ID, and the output apparatus 30 requests to perform authentication using the one-time password and the user ID, which are transmitted from the information processing device 10 to the output apparatus 30. Accordingly, the information processing device 10 does not transmit authentication information such as a password to the output apparatus 30, and there is no risk of leakage of the authentication information. Even if the one-time password is leaked, since the number of accessible times with the one-time password by an arbitrary user is one, information to be leaked is minimized. In addition, the validity period is set to the one-time password, and this also reduces the risk in case of leakage of the one-time password. In addition, the user does not touch the output apparatus that is operated by an unspecified number of users. In addition, the user may not connect the information processing device 10 to the same network as the output apparatus 30.

Variation:

The above-described embodiment is illustrative and does not limit the present disclosure. Thus, numerous additional modifications and variations are possible in light of the above teachings within the scope of the present disclosure. For example, elements and/or features of different illustrative embodiments may be combined with each other and/or substituted for each other within the scope of the present invention. Any one of the above-described operations may be performed in various other ways, for example, in an order different from the one described above.

For example, in addition to the information processing device 10, the output apparatus 30 may display the print job list. The user may select the print job to be executed by the output apparatus 30. In this case, the user may set print settings on the output apparatus 30.

In the present embodiment, an image forming apparatus is mainly used as an example of the output apparatus 30, but the output apparatus 30 is not limited to the image forming apparatus. The output apparatus 30 includes, for example, an output device such as a projector (PJ), an interactive white board (IWB) (a white board having an electronic whiteboard having a function of performing mutual communication), a digital signage, a head up display (HUD) device, and an industrial machine, an imaging device, a sound collecting device, a medical device, a network home appliance, an automobile (connected car), a notebook PC, a mobile phone, a smartphone, a tablet terminal, a game console, a Personal Digital Assistant (PDA), a digital camera, a wearable PC or a desktop PC.

For example, the functional configuration illustrated in FIG. 7 is divided according to main functions in order to facilitate understanding of processing performed by the information processing device 10, the output system 50, and the output apparatus 30. Each processing unit or each specific name of the processing unit is not to limit a scope of the present disclosure. The processing of the information processing device 10, the output system 50, and the output apparatus 30 may be divided into more processing units according to the processing content. Also, one processing unit may be divided so as to include more processes.

The devices (apparatuses) and the like described in the examples are merely an illustration of one of several computing environments for implementing the embodiment disclosed herein. In some embodiments, the output system 50 includes multiple computing devices, such as a server cluster. The multiple computing devices communicate with one another through any type of communication link including a network, shared memory, etc., and perform a process described in the embodiment.

Further, the output system 50 may be configured to share the disclosed processing steps, for example, FIG. 9A and FIG. 9B (FIG. 9), in various combinations. For example, a process executed by a given unit may be executed by a plurality of information processing devices 10 included in the output system 50. Further, the output system 50 may be integrated into one server device or may be divided into a plurality of devices.

Each of the functions of the described embodiments may be implemented by one or more processing circuits or circuitry. Here, the "processing circuit or circuitry" in the present disclosure includes a programmed processor to execute each function by software, such as a processor implemented by an electronic circuit, and devices, such as an Application Specific Integrated Circuit (ASIC), a Digital Signal Processors (DSP), a Field Programmable Gate Array (FPGA), and conventional circuit modules arranged to perform the recited functions.

According to some embodiments, an information processing system (for example, the information processing system 1 in the above-described embodiment) includes an output system (for example, the output system 50 in the above-described embodiment), an output apparatus (for example, the output apparatus 30 in the above-described embodiment), and a program executed on an information processing device (for example, the information processing device 10 in the above-described embodiment). The output system is communicably connected to each of the output apparatus and the information processing device. By executing the program, the information processing device functions as a communication unit (for example, the fourth communication unit 11 in the above-described embodiment) configured to transmit user identification information to the output apparatus. The output apparatus includes a communication unit (for example, the third communication unit 33 in the above-described embodiment) configured to transmit an authentication request including the user identification information received from the information processing device. The output system includes an authentication unit (for example, the authentication unit 52 in the above-described embodiment) configured to generate information on a character string in response to the authentication request including the user identification information from the output apparatus. The output system further includes a communication unit (for example, the first communication unit 51 in the above-described embodiment) configured to transmit the information on the character string to the information processing device. The communication unit (for example, the fourth communication unit 11 in the above-described embodiment) of the information processing device transmits the information on the character string from the output system to the output apparatus. The output apparatus receives the information on the character string from the information processing device. In response to receiving the information on the character string and the user identification information from the output apparatus, the authentication unit of the output system performs authentication for a user identified by the user identification information. The output apparatus received the information on the character string and the user identification information from the information processing device in advance. The output system further includes another communication unit (for example, the second communication unit 55 in the above-described embodiment) configured to transmit an authentication result to the output apparatus.

In the information processing system, by executing the program, the information processing device functions as a display control unit (for example, the display control unit 13 in the above-described embodiment) configured to display information (a message) indicating that the information processing device is to be in proximity to the output apparatus from a time at which the communication unit (for example, the fourth communication unit 11 in the above-described embodiment) of the information processing device starts communicating with the output apparatus until when the communication unit of the information processing device transmits the information on the character string. In a case that the information processing device disconnects from communication established with the output apparatus before the communication unit (for example, the fourth communication unit 11 in the above-described embodiment) of the information processing device completes transmission of the information on the character string, the display control unit displays the information (message) again.

In the information processing system, when starting the communication with the information processing device, the output apparatus displays information (a message) indicating that the information processing device is to be in proximity to the output apparatus until the output apparatus receives the information on the character string.

In a conventional technique, an information processing device transmits authentication information to an output apparatus for authentication. For example, when a user directly operates the output apparatus to acquire a print job from an output system to execute the print job, the user inputs the authentication information to the output apparatus. However, there is a demand for executing printing without touching the output apparatus which is often used by a plurality of users. Establishing a communication between the information processing device and the output apparatus may achieve this demand. In addition, the information processing device carried by the user and the output apparatus that is, for example, a facility belongs to a company are not connected to the same network (wireless local area network, 4G, 5G, etc.) for security reasons. To cope with this, establishing a communication between the information processing device and the output apparatus by near field wireless communication under condition that the information processing device and the output apparatus do not connect to the same network is considered. However, in the near field wireless communication, if there is a terminal or the like that impersonates the output apparatus, the authentication information transmitted by the information processing device may be leaked. When the authentication information is leaked, there is a security risk that various operations may be performed by one other than the user instead of the user.

According to some embodiments of the disclosure, an output system that performs authentication for a user without transmission of at least a part of information to be used for the authentication from an information processing device to an output apparatus is provided.

The invention claimed is:

1. An output system, comprising circuitry configured to:
generate information on a character string in response to an authentication request including user identification information transmitted from an outputter; and
transmit the information on the character string to an information processor,
wherein, in response to receiving the information on the character string and the user identification information from the outputter that has received the information on the character string and the user identification information from the information processor, the circuitry further
performs authentication for a user identified by the user identification information, based on the information on the character string and the user identification information, and
transmits an authentication result to the outputter,
wherein the circuitry further transmits, to the information processor, a Uniform Resource Locator (URL) for authenticating the user with information on user authority by push notification, and
wherein, in response to the information processor connecting to the URL with the information on the user authority, the circuitry transmits the information on the character string to the information processor by Hyper Text Transfer Protocol Secure (HTTPS) communication.

2. The output system of claim 1,
wherein the information processor to which the information on the character string is transmitted is associated with the user identification information.

3. The output system of claim 1,
wherein, in response to authentication that is performed based on authentication information transmitted from the information processor being successful, the circuitry further:
issues information on user authority to be stored;
transmits to the outputter the information on the user authority, in response to the authentication result being successful authentication; and
transmits data to the outputter, in response to receiving, from the outputter, a data output request including the information on the user authority.

4. The output system of claim 1,
wherein the circuitry transmits the information on the character string to the information processor by push notification.

5. The output system of claim 1,
wherein, in response to the authentication result being successful authentication, the circuitry further deletes the information on the character string.

6. The output system of claim 1,
wherein the information on the character string has a validity period starting from a time when the information on the character string is issued, and
the circuitry further deletes the information on the character string in response to the validity period having passed.

7. An information processing system, comprising:
an outputter; and
an output system,
the outputter including first circuitry configured to transmit, to the output system, an authentication request including user identification information transmitted from an information processor,
the output system including second circuitry configured to generate information on a character string in response to the authentication request including the user identification information transmitted from the outputter, and transmit the information on the character string to the information processor,
wherein the first circuitry of the outputter receives the information on the character string from the information processor,
wherein, in response to receiving the information on the character string and the user identification information from the outputter that has received the information on the character string and the user identification information from the information processor, the second circuitry of the output system further
performs authentication for a user identified by the user identification information, based on the information on the character string and the user identification information, and
transmits an authentication result to the outputter,
wherein the second circuitry further transmits, to the information processor, a Uniform Resource Locator (URL) for authenticating the user with information on user authority by push notification, and
wherein, in response to the information processor connecting to the URL with the information on the user authority, the second circuitry transmits the information on the character string to the information processor by Hyper Text Transfer Protocol Secure (HTTPS) communication.

8. The information processing system of claim 7,
wherein the first circuitry of the outputter receives the user identification information from the information processor by near field wireless communication.

9. The information processing system of claim 8,
wherein the first circuitry of the outputter transmits the authentication request including the user identification information to the output system by communication method different from the near field wireless communication.

10. An authentication method, comprising:
generating information on a character string in response to an authentication request including user identification information transmitted from an outputter;
transmitting to an information processor a Uniform Resource Locator (URL) for authenticating the user with information on user authority by push notification;
in response to the information processor connecting to the URL with the information on the user authority, transmitting the information on the character string to the information processor by Hyper Text Transfer Protocol Secure (HTTPS) communication;
performing authentication for a user identified by the user identification information in response to receiving the information on the character string and the user identification information from the outputter that has received the information on the character string and the user identification information from the information processor; and
transmitting an authentication result to the outputter.

* * * * *